(12) United States Patent
Friesen et al.

(10) Patent No.: US 11,707,710 B2
(45) Date of Patent: *Jul. 25, 2023

(54) SYSTEMS AND METHODS FOR GENERATING LIQUID WATER FROM AIR

(71) Applicant: Arizona Board of Regents on Behalf of Arizona State University, Scottsdale, AZ (US)

(72) Inventors: Cody Friesen, Fort McDowell, AZ (US); Elise Switzer, Napa, CA (US); Heath Lorzel, Mesa, AZ (US)

(73) Assignee: Arizona Board of Regents on Behalf of Arizona State University, Scottsdale, AZ (US)

( * ) Notice: Subject to any disclaimer, the term of this patent is extended or adjusted under 35 U.S.C. 154(b) by 177 days.

This patent is subject to a terminal disclaimer.

(21) Appl. No.: 17/081,898

(22) Filed: Oct. 27, 2020

(65) Prior Publication Data

US 2021/0106946 A1 Apr. 15, 2021

Related U.S. Application Data

(63) Continuation of application No. 15/528,366, filed as application No. PCT/US2015/061921 on Nov. 20, 2015, now Pat. No. 10,835,861.

(Continued)

(51) Int. Cl.
*B01D 53/26* (2006.01)
*B01D 53/06* (2006.01)
(Continued)

(52) U.S. Cl.
CPC ....... *B01D 53/261* (2013.01); *B01D 53/0454* (2013.01); *B01D 53/06* (2013.01);
(Continued)

(58) Field of Classification Search
None
See application file for complete search history.

(56) References Cited

U.S. PATENT DOCUMENTS

| 1,816,592 | A | 7/1931 | Knapen |
| 2,138,689 | A | 11/1938 | Mtenkirch |

(Continued)

FOREIGN PATENT DOCUMENTS

| CN | 101589282 | 11/2009 |
| CN | 102042645 | 5/2011 |

(Continued)

OTHER PUBLICATIONS

Ali et al., "Desiccant Enhanced Nocturnal Radiative Cooling-Solar Collector System for Air Comfort Application in Hot Arid Areas," Int. J. of Thermal & Environmental Engineering, vol. 5, No. 1, pp. 71-82, 2013.

(Continued)

*Primary Examiner* — Christopher P Jones
*Assistant Examiner* — Phillip Y Shao
(74) *Attorney, Agent, or Firm* — Snell & Wilmer L.L.P.

(57) ABSTRACT

This disclosure includes systems and methods for extracting water vapor from atmospheric air and, more particularly, but not by way of limitation, systems and methods for optimizing liquid water production from air, in some instances, taking into account diurnal variations. The systems comprise an adsorption zone an a desorption zone, an actuator to move a desiccant between the adsorption zone and the desorption zone. The liquid water production is optimized based, at least in part, on measurements of one or more of: an ambient air temperature, ambient air relative humidity, and a level of solar insolation.

34 Claims, 19 Drawing Sheets

Related U.S. Application Data

(60) Provisional application No. 62/145,995, filed on Apr. 10, 2015, provisional application No. 62/082,335, filed on Nov. 20, 2014.

(51) Int. Cl.
| | | |
|---|---|---|
| *E03B 3/28* | (2006.01) | |
| *B01D 53/04* | (2006.01) | |
| *C02F 1/32* | (2023.01) | |
| *C02F 1/44* | (2023.01) | |
| *C02F 1/68* | (2023.01) | |

(52) U.S. Cl.
CPC ............... *C02F 1/325* (2013.01); *C02F 1/44* (2013.01); *C02F 1/68* (2013.01); *E03B 3/28* (2013.01); *B01D 2259/4009* (2013.01); *C02F 2201/3222* (2013.01); *C02F 2209/42* (2013.01); *C02F 2303/04* (2013.01); *Y02A 20/00* (2018.01)

(56) References Cited

U.S. PATENT DOCUMENTS

| | | | |
|---|---|---|---|
| 2,462,952 | A | 3/1949 | Dunkak |
| 2,700,537 | A | 1/1955 | Pennington |
| 2,761,292 | A | 9/1956 | Coanda et al. |
| 3,400,515 | A | 9/1968 | Ackerman |
| 3,740,959 | A | 6/1973 | Foss |
| 3,889,532 | A | 6/1975 | Pilie et al. |
| 4,054,124 | A | 10/1977 | Knoos |
| 4,080,186 | A | 3/1978 | Ockert |
| 4,117,831 | A | 10/1978 | Bansal et al. |
| 4,134,743 | A | 1/1979 | Macriss et al. |
| 4,136,672 | A | 1/1979 | Hallanger |
| 4,146,372 | A | 3/1979 | Groth et al. |
| 4,169,459 | A | 10/1979 | Ehrlich |
| 4,185,969 | A | 1/1980 | Bulang |
| 4,201,195 | A | 5/1980 | Sakhuja |
| 4,219,341 | A | 8/1980 | Hussmann |
| 4,222,244 | A | 9/1980 | Meckler |
| 4,234,037 | A | 11/1980 | Rogers et al. |
| 4,242,112 | A | 12/1980 | Jebens |
| 4,285,702 | A | 8/1981 | Michel et al. |
| 4,304,577 | A | 12/1981 | Ito et al. |
| 4,315,599 | A | 2/1982 | Biancardi |
| 4,334,524 | A | 6/1982 | McCullough et al. |
| 4,342,569 | A | 8/1982 | Hussmann |
| 4,345,917 | A | 8/1982 | Hussmann |
| 4,351,651 | A | 9/1982 | Courneya |
| 4,374,655 | A | 2/1983 | Grodzka et al. |
| 4,377,398 | A | 3/1983 | Bennett |
| 4,398,927 | A | 8/1983 | Asher et al. |
| 4,433,552 | A | 2/1984 | Smith |
| 4,478,210 | A | 10/1984 | Sieradski |
| 4,722,192 | A | 2/1988 | Koblitz et al. |
| 4,726,817 | A | 2/1988 | Roger |
| 4,926,618 | A | 5/1990 | Ratliff |
| 5,058,388 | A | 10/1991 | Shaw et al. |
| 5,275,643 | A | 1/1994 | Usui |
| 5,579,647 | A | 12/1996 | Calton et al. |
| 5,701,749 | A | 12/1997 | Zakryk |
| 5,729,981 | A | 3/1998 | Markus et al. |
| 5,758,511 | A | 6/1998 | Yoho et al. |
| 5,846,296 | A | 12/1998 | Krumsvik |
| 5,873,256 | A | 2/1999 | Denniston |
| 5,989,313 | A | 11/1999 | Mize |
| 6,029,467 | A | 2/2000 | Moratalla |
| 6,156,102 | A | 12/2000 | Conrad et al. |
| 6,199,388 | B1 | 3/2001 | Fischer, Jr. |
| 6,336,957 | B1 | 1/2002 | Tsymerman |
| 6,447,583 | B1 | 9/2002 | Thelen et al. |
| 6,490,879 | B1 | 12/2002 | Lloyd et al. |
| 6,511,525 | B2 | 1/2003 | Spletzer et al. |
| 6,513,339 | B1 | 2/2003 | Kopko |
| 6,557,365 | B2 | 5/2003 | Dinnage et al. |
| 6,574,979 | B2 | 6/2003 | Faqih |
| 6,644,060 | B1 | 11/2003 | Dagan |
| 6,828,499 | B2 | 12/2004 | Max |
| 6,869,464 | B2 | 3/2005 | Klemic |
| 6,945,063 | B2 | 9/2005 | Max |
| 6,957,543 | B1 | 10/2005 | Reznik |
| 7,017,356 | B2 | 3/2006 | Moffitt |
| 7,043,934 | B2 | 5/2006 | Rademacher et al. |
| 7,178,355 | B2 | 2/2007 | Moffitt |
| 7,251,945 | B2 | 8/2007 | Tongue |
| 7,305,849 | B2 | 12/2007 | Löffler et al. |
| 7,306,654 | B2 | 12/2007 | King et al. |
| 7,478,535 | B2 | 1/2009 | Turner, Jr. |
| 7,740,765 | B2 | 6/2010 | Mitchell et al. |
| 7,866,176 | B2 | 1/2011 | Vetrovec et al. |
| 7,905,097 | B1 | 3/2011 | Fort |
| 7,926,481 | B2 | 4/2011 | Edwards et al. |
| 8,075,652 | B2 | 12/2011 | Melikyan |
| 8,118,912 | B2 | 2/2012 | Rodriguez et al. |
| 8,187,368 | B2 | 5/2012 | Shih et al. |
| 8,196,422 | B2 | 6/2012 | Ritchey |
| 8,328,904 | B2 | 12/2012 | Griffiths et al. |
| 8,425,660 | B2 | 4/2013 | Ike et al. |
| 8,506,675 | B2 | 8/2013 | Ellsworth |
| 8,844,299 | B2 | 9/2014 | Ferreira et al. |
| 10,357,739 | B2 | 7/2019 | Friesen et al. |
| 2003/0091881 | A1 | 5/2003 | Eisler et al. |
| 2003/0101161 | A1 | 5/2003 | Ferguson et al. |
| 2004/0000165 | A1 | 1/2004 | Max |
| 2004/0055309 | A1 | 3/2004 | Bellows et al. |
| 2005/0084415 | A1 | 4/2005 | McVey et al. |
| 2005/0204914 | A1 | 9/2005 | Boutall |
| 2005/0249631 | A1 | 11/2005 | Schulz et al. |
| 2005/0284167 | A1 | 12/2005 | Morgan et al. |
| 2006/0017740 | A1 | 1/2006 | Coleman |
| 2006/0032493 | A1 | 2/2006 | Ritchey |
| 2006/0112709 | A1 | 6/2006 | Boyle |
| 2006/0130654 | A1 | 6/2006 | King et al. |
| 2006/0288709 | A1 | 12/2006 | Reidy |
| 2007/0028769 | A1 | 2/2007 | Eplee et al. |
| 2007/0101862 | A1 | 5/2007 | Tongue |
| 2007/0150424 | A1 | 6/2007 | Igelnik |
| 2007/0274858 | A1 | 11/2007 | Childers et al. |
| 2007/0295021 | A1 | 12/2007 | Tyls et al. |
| 2008/0135495 | A1 | 6/2008 | Sher |
| 2008/0224652 | A1 | 9/2008 | Zhu et al. |
| 2008/0289352 | A1 | 11/2008 | Parent |
| 2009/0025711 | A1 | 1/2009 | Edwards et al. |
| 2009/0093916 | A1 | 4/2009 | Parsonnet et al. |
| 2009/0211276 | A1 | 8/2009 | Forkosh |
| 2009/0223514 | A1 | 9/2009 | Smith et al. |
| 2010/0083673 | A1 | 4/2010 | Merritt |
| 2010/0170499 | A1 | 7/2010 | Bar |
| 2010/0192605 | A1 | 8/2010 | Fang et al. |
| 2010/0275629 | A1 | 11/2010 | Erickson |
| 2010/0275775 | A1 | 11/2010 | Griffiths et al. |
| 2011/0048039 | A1 | 3/2011 | Kohavi et al. |
| 2011/0056220 | A1 | 3/2011 | Caggiano |
| 2011/0083458 | A1 | 4/2011 | Takakura et al. |
| 2011/0132027 | A1 | 6/2011 | Gommed et al. |
| 2011/0232485 | A1 | 9/2011 | Ellsworth |
| 2011/0247353 | A1 | 10/2011 | Metz |
| 2012/0227582 | A1 | 9/2012 | Wamstad et al. |
| 2013/0269522 | A1 | 10/2013 | DeValve |
| 2013/0312451 | A1 | 11/2013 | Max |
| 2013/0318790 | A1 | 12/2013 | Becze et al. |
| 2014/0034475 | A1 | 2/2014 | Kamen et al. |
| 2014/0138236 | A1 | 5/2014 | White |
| 2014/0157985 | A1 | 6/2014 | Scovazzo et al. |
| 2015/0033774 | A1 | 2/2015 | Ferreira et al. |
| 2015/0194926 | A1 | 7/2015 | Bushong, Jr. |
| 2016/0162456 | A1 | 6/2016 | Munro et al. |
| 2016/0197364 | A1 | 7/2016 | Rama et al. |
| 2016/0333553 | A1 | 11/2016 | Dorfman |

(56) References Cited

U.S. PATENT DOCUMENTS

2017/0024641 A1 1/2017 Wierzynski
2017/0323221 A1 11/2017 Chaudhuri et al.

FOREIGN PATENT DOCUMENTS

| CN | 102297503 | 12/2011 |
|---|---|---|
| CN | 102441320 | 5/2012 |
| CN | 102733451 | 10/2012 |
| CN | 202850099 | 4/2013 |
| CN | 203777907 | 8/2014 |
| CN | 104813107 | 7/2015 |
| EP | 1139554 | 10/2001 |
| EP | 2305362 | 4/2011 |
| FR | 2813087 | 2/2002 |
| WO | 2007041804 | 4/2007 |
| WO | 2007051886 | 5/2007 |
| WO | 2012009024 | 1/2012 |
| WO | 2012128619 | 9/2012 |
| WO | 2012162760 | 12/2012 |
| WO | 2013026126 | 2/2013 |
| WO | 2013182911 | 12/2013 |
| WO | 2014085860 | 6/2014 |
| WO | 2016081863 | 5/2016 |
| WO | 2016187709 | 12/2016 |

OTHER PUBLICATIONS

Anand et al., "Solar Cooling Systems for Climate Change Mitigation: A Review," Renewable and Sustainable Energy Reviews, vol. 41, pp. 143-161, Jan. 2015.

De Antonellis et al., "Simulation, Performance Analysis and Optimization of Desiccant Wheels," Energy and Buildings, vol. 42, No. 9, pp. 1386-1393, 2010.

Eriksson et al., "Diurnal Variations of Humidity and Ice Water Content in the Tropical Upper Troposphere," Atmos Chem. Phys., vol. 10, pp. 11519-11533, 2010.

European Solar Thermal Industry Federation (ESTIF), "Key Issues for Renewable Heat in Europe (K4RES-H)," Solar Assisted Cooling—WP3, Task 3.5, Contract EIE/04/204/S07.38607, pp. 1-21, Aug. 23, 2006.

Ge et al., "A Mathematical Model for Predicting the Performance of a Compound Desiccant Wheel (A Model of Compound Desiccant Wheel)," Applied Thermal Engineering, vol. 30, No. 8, pp. 1005-1015, Jun. 2010.

Kassem et al., "Solar Powered Dehumidification Systems Using Desert Evaporative Coolers: Review," International Journal of Engineering and Advanced Technology (IJEAT), ISSN: 2249-8958, vol. 3, Issue 1, Oct. 2013.

Kolewar et al., "Feasability of Solar Desiccant Evaporative Cooling: A Review," International Journal of Scientific & Engineering Research, ISSN: 2229-5518, vol. 5, Issue 10, Oct. 2014.

La et al., "Technical Development of Rotary Desiccant Dehumidification and Air Conditioning: A Review," Renewable and Sustainable Energy Reviews, vol. 14, pp. 130-147, 2010.

Nia et al., "Modeling and Simulation of Desiccant Wheel for Air Conditioning," Energy and Buildings, vol. 38, No. 10, pp. 1230-1239, Oct. 2006.

Kozubal et al.," Desiccant Enhanced Evaporative Air-Conditioning (DEVap): Evaluation of a New Concept in Ultra Efficient Air Conditioning," National Renewal Energy Laboratory (NREL), Technical Report, NREL/TP-5500-49722, Jan. 2011.

Critoph et al., "Solar Energy for Cooling and Refrigeration," Engineering Department, University of Warwick, Coventry, CV4 7AL, United Kingdom, 1997.

Wahlgren, "Atmospheric Water Vapour Processor Designs for Potable Water Production: A Review," Wat. Res., vol. 35, No. 1, pp. 1-22, 2001.

Gad et al., Application of a Solar Desiccant/Collector System for Water Recovery From Atmospheric Air, Renewal Energy, vol. 22, No. 4, pp. 541-556, Apr. 2001.

William et al., "Desiccant System for Water Production From Humid Air Using Solar Energy," Energy, vol. 90, pp. 1707-1720, 2015.

International Search Report and Written Opinion for Application No. PCT/US2017/026609, dated Jun. 19, 2017.

International Search Report and Written Opinion for Application No. PCT/US2018/064308, dated Mar. 29, 2019.

International Search Report and Written Opinion for Application No. PCT/US2018/042098, dated Mar. 6, 2019.

International Search Report and Written Opinion for Application No. PCT/US2018/049411, dated Dec. 3, 2018.

International Search Report and Written Opinion for Application No. PCT/US2018/049398, dated Dec. 3, 2018.

International Search Report and Written Opinion for Application No. PCT/US2018/054715, dated Jan. 15, 2019.

International Search Report and Written Opinion for Application No. PCT/US2017/033540, dated Aug. 16, 2017.

International Search Report and Written Opinion for Application No. PCT/US2015/061921, dated Apr. 29, 2016.

SYSTEMS AND METHODS FOR GENERATING LIQUID WATER FROM AIR

This application is a continuation of, and claims priority to U.S. Non-Provisional patent application Ser. No. 15/528,366, filed May 19, 2017, which is a § 317 national stage application of PCT/US2015/061921, filed Nov. 20, 2015, which claims the benefit of priority to U.S. Provisional Patent Application Ser. No. 62/082,335, filed Nov. 20, 2014, and U.S. Provisional Patent Application Ser. No. 62/145,995, filed Apr. 10, 2015, each of which are hereby incorporated by reference in their entirety.

This application claims the benefit of priority to U.S. Provisional Patent Application Ser. No. 62/082,335, filed Nov. 20, 2014, and U.S. Provisional Patent Application Ser. No. 62/145,995, filed Apr. 10, 2015, each of which are hereby incorporated by reference in their entirety.

BACKGROUND

1. Field of Invention

The present invention is generally related to the extraction of water vapor from atmospheric air and more specifically, but not by way of limitation, to systems and methods for efficiently generating liquid water from air at an optimized liquid water production rate, in some instances, taking into account diurnal variations in ambient conditions.

2. Description of Related Art

Numerous devices and methods for obtaining potable water from atmospheric humidity have been considered; however, most concepts are less than attractive for various reasons, including: a need for external power, a high degree of complexity, a low liquid water production rate, a high inefficiency, impurities in produced water, a high system cost, and/or a need for a large tract of land.

Various systems and methods employ sorption media to adsorb water from air to generate usable water. Once the sorption media, or desiccant, is saturated with water, it must typically be regenerated by a temperature or pressure swing. For example, several systems employ desiccants to produce water from atmospheric humidity by operating in one mode during the day and then operating in a second mode at night (e.g., in a batch process). For example, U.S. Pat. Nos. 3,400,515, 4,146,372, 4,219,341, and 4,285,702 disclose systems which operate via adsorption of water at night, desorption of water by day (e.g., via solar energy), and condensation, which typically requires energy from an external energy source. The disadvantages of such systems may include a high degree of complexity, a large size, a low liquid water production rate, high inefficiencies, high electrical power requirements for operation, and/or the like. Furthermore, many such systems require complex and energy-intensive components (e.g., compressors, components used in refrigeration cycles, and/or the like). Some such systems that operate in different day and night modes may produce amounts of impure water, which may not meet potable water requirements for human consumption.

Examples of water from air systems are disclosed in U.S. Pat. Nos. 8,425,660, 8,118,912, and 7,905,097, and examples of dehumidifiers are disclosed in U.S. Pat. No. 8,328,904 and U.S. Publication No. 2013/0160644.

SUMMARY

This disclosure includes embodiments of systems and methods, such as, for example, for generating liquid water from air.

Some embodiments of the present systems (e.g., for generating liquid water from air) comprise: a housing defining an adsorption zone and a desorption zone; a desiccant (e.g., selectively movable between: an adsorption zone in which the desiccant is in fluid communication with a process airflow path such that the desiccant can capture water from air in the process airflow path; and a desorption zone in which the desiccant is in fluid communication with a regeneration fluid path such that the desiccant can release water to regeneration fluid in the regeneration fluid path); an actuator configured to move the desiccant between the adsorption zone and the desorption zone; a first blower configured to adjust a flow rate of air through the process airflow path; a circulator configured to adjust a flow rate of regeneration fluid through the regeneration fluid path; a thermal unit comprising a casing in fluid communication with the regeneration fluid path and configured to provide thermal energy to regeneration fluid in the regeneration fluid path; a condenser configured to receive regeneration fluid from the desorption zone via the regeneration fluid path and to produce liquid water from the received regeneration fluid; and a controller configured to optimize liquid water production based, at least in part, on measurements of one or more of: an ambient air temperature, ambient air relative humidity, and a level of solar insolation. In some embodiments, the controller is configured to optimize liquid water production at least by controlling a blower speed of the first blower and a speed of the circulator.

Some embodiments of the present systems (e.g., for generating liquid water from air) comprise: a housing defining an adsorption zone and a desorption zone; a desiccant (e.g., continuously and selectively movable between: an adsorption zone in which the desiccant is in fluid communication with a process airflow path such that the desiccant can capture water from air in the process airflow path; and a desorption zone in which the desiccant is in fluid communication with a regeneration fluid path such that the desiccant can release water to regeneration fluid in the regeneration fluid path); an actuator configured to move the desiccant between the adsorption zone and the desorption zone; a thermal unit comprising a casing in fluid communication with the regeneration fluid path and configured to provide thermal energy to regeneration fluid in the regeneration fluid path; a condenser configured to receive regeneration fluid from the desorption zone via the regeneration fluid path and to produce liquid water from the received regeneration fluid; and a controller configured to optimize liquid water production based, at least in part, on measurements of one or more of: an ambient air temperature, ambient air relative humidity, and a level of solar insolation. In some embodiments, the controller is configured to optimize liquid water production at least by controlling movement of the desiccant between the adsorption zone and the desorption zone.

Some embodiments of the present systems (e.g., for generating liquid water from air) comprise: a housing defining an adsorption zone and a desorption zone; a desiccant (e.g., selectively movable between: an adsorption zone in which the desiccant is in fluid communication with a process airflow path such that the desiccant can capture water from air in the process airflow path; and a desorption zone in which the desiccant is in fluid communication with a regeneration fluid path such that the desiccant can release water to regeneration fluid in the regeneration fluid path); an actuator configured to move the desiccant between the adsorption zone and the desorption zone; a thermal unit comprising a casing in fluid communication with the regeneration fluid path and configured to provide thermal energy to regeneration fluid in the regeneration fluid path; a condenser configured to receive regeneration fluid from the desorption zone via the regeneration fluid path and to produce liquid water from the received regeneration fluid; and a controller configured to optimize liquid water production at least by controlling a rate of desiccant movement between the adsorption zone and the desorption zone based, at least in part, on an optimal rate of desiccant movement, contained in a look-up table, that corresponds to measurements of two or more of: an ambient air temperature, ambient air relative humidity, and a level of solar insolation.

Some embodiments of the present systems further comprise: a first blower configured to adjust a flow rate of air through the process airflow path; and a circulator configured to adjust a flow rate of regeneration fluid through the regeneration fluid path. In some embodiments, the controller is configured to optimize liquid water production at least by controlling a blower speed of the first blower and a speed of the circulator. In some embodiments, the controller is configured to optimize liquid water production over a diurnal cycle based, at least in part, on diurnal variations in measurements of one or more of: an ambient air temperature, ambient air relative humidity, and a level of solar insolation. In some embodiments, the housing is configured such that dimensions of the adsorption zone and the desorption zone are adjustable.

Some embodiments of the present systems further comprise: a temperature sensor configured to capture data indicative of an ambient air temperature.

Some embodiments of the present systems further comprise: a humidity sensor configured to capture data indicative of an ambient air relative humidity.

Some embodiments of the present systems further comprise: a solar insolation sensor configured to capture data indicative of a level of solar insolation. In some embodiments, the solar insolation sensor comprises a temperature sensor configured to capture data indicative of a temperature of regeneration fluid in the regeneration fluid path downstream of the thermal unit.

Some embodiments of the present systems further comprise: a temperature sensor configured to capture data indicative of a temperature of air in the process airflow path; where the controller is configured to optimize liquid water production based, at least in part, on the data captured by the temperature sensor.

Some embodiments of the present systems further comprise: a humidity sensor configured to capture data indicative of a relative humidity of air in the process airflow path; where the controller is configured to optimize liquid water production based, at least in part, on the data captured by the humidity sensor.

Some embodiments of the present systems further comprise: a humidity sensor configured to capture data indicative of a relative humidity of regeneration fluid in the regeneration fluid path; where the controller is configured to optimize liquid water production based, at least in part, on the data captured by the humidity sensor.

Some embodiments of the present systems further comprise: a flow sensor configured to capture data indicative of a flow rate of air through the process airflow path; where the controller is configured to optimize liquid water production based, at least in part, on the data captured by the flow sensor.

Some embodiments of the present systems further comprise: a flow sensor configured to capture data indicative of a flow rate of regeneration fluid through the regeneration fluid path; where the controller is configured to optimize liquid water production based, at least in part, on the data captured by the flow sensor.

In some embodiments of the present systems, the thermal unit is configured to absorb sunlight to provide at least a portion of the thermal energy to regeneration fluid in the regeneration fluid path. In some embodiments, the thermal unit comprises: a transparent layer configured to allow sunlight to enter the casing of the thermal unit; an absorber configured to absorb thermal energy from the sunlight and provide at least a portion of the absorbed thermal energy to regeneration fluid in the regeneration fluid path; and an insulator configured to insulate at least a portion of the casing.

In some embodiments of the present systems, the condenser is configured to transfer thermal energy from regeneration fluid in the regeneration fluid path downstream of the desiccant to air in the process airflow path upstream of the desiccant.

Some embodiments of the present systems further comprise: a water collection unit configured to receive the produced liquid water from the condenser. In some embodiments, the water collection unit comprises a filter. In some embodiments, the water collection unit comprises an ultraviolet (UV) light source. In some embodiments, the water collection unit comprises a receptacle configured to receive one or more additives for introduction to the produced liquid water. In some embodiments, the water collection unit has a footprint with a maximum transverse dimension less than or equal to 8 feet (ft). In some embodiments, an area of the footprint is less than or equal to 64 square feet ($ft^2$). In some embodiments, the water collection unit can be contained within a cubic volume less than or equal to 512 cubic feet ($ft^3$).

Some embodiments of the present systems further comprise: a solar power unit configured to provide electrical power to the system. In some embodiments, the solar power unit comprises a solar panel. In some embodiments, the system is configured to operate without an external source of electrical power.

Some embodiments of the present systems further comprise: a purge airflow path configured to transfer thermal energy from a portion of the adsorption zone to a portion of the desorption zone. In some embodiments, the controller is configured to optimize liquid water production based, at least in part, on a temperature of air in the purge airflow path.

Some embodiments of the present systems further comprise: a recovery heat exchanger configured to transfer thermal energy from regeneration fluid in the regeneration fluid path downstream of the desiccant to regeneration fluid in the regeneration fluid path upstream of the desiccant.

Some embodiments of the present systems further comprise: a second desiccant configured to transfer water from regeneration fluid in the regeneration fluid path downstream of the condenser to regeneration fluid in the regeneration fluid path upstream the condenser.

In some embodiments of the present systems, the desiccant is disposed on a disk, the desiccant configured to move between the adsorption zone and the desorption zone as the disk is rotated.

Some embodiments of the present systems are configured such that a first portion of the desiccant can be disposed within the adsorption zone with a second portion of the desiccant simultaneously disposed within the desorption zone.

In some embodiments of the present systems, each of the housing, the thermal unit, and the condenser have a footprint with a maximum transverse dimension less than or equal to 8 feet (ft).

Some embodiments of the present systems further comprise: a transceiver configured to receive and transmit information associated with operation of the system.

In some embodiments of the present systems, the regeneration fluid path comprises a closed-loop.

Some embodiments of the present methods (e.g., for generating liquid water from air) comprise: moving a desiccant into fluid communication with a process airflow path such that the desiccant captures water from air in the process airflow path; communicating regeneration fluid in a regeneration fluid path through a housing of a thermal unit to heat regeneration fluid in the regeneration fluid path; moving the desiccant into fluid communication with the regeneration fluid path such that the desiccant releases water to regeneration fluid in the regeneration fluid path; receiving, in a condenser, regeneration fluid from the desiccant via the regeneration fluid path to produce liquid water from the received regeneration fluid; and controlling, with a controller, at least a rate of the movement of the desiccant to optimize liquid water production based on one or more of: an ambient air temperature, ambient air relative humidity, and a level of solar insolation. In some embodiments, the controlling is performed, at least in part, by the controller referencing an optimal rate of desiccant movement, contained in a look-up table, that corresponds to at least one of: an ambient air temperature, an ambient air relative humidity, and a level of solar insolation. In some embodiments, the controlling is performed, at least in part, by the controller determining an optimal rate of desiccant movement as indicated by a parametric function based on at least one of: an ambient air temperature, an ambient air relative humidity, and a level of solar insolation.

Some embodiments of the present methods further comprise: generating the look-up table by: performing a simulation of a system of any of claims at each of a plurality of operational parameter sets, each operational parameter set including at least: an ambient air temperature, ambient air relative humidity, and a level of solar insolation; determining, for each of the plurality of operational parameter sets, at least an optimal rate of desiccant movement that optimizes liquid water production by the system; and storing each optimal rate of desiccant movement in the look-up table.

In some embodiments of the present methods, the controlling comprises optimizing liquid water production based, at least in part, on a temperature of regeneration fluid in the regeneration fluid path downstream of the thermal unit.

In some embodiments of the present methods, the controlling comprises optimizing liquid water production based, at least in part, on a temperature of air in the process airflow path.

In some embodiments of the present methods, the controlling comprises optimizing liquid water production based, at least in part, on a relative humidity of air in the process airflow path.

In some embodiments of the present methods, the controlling comprises optimizing liquid water production based, at least in part, on a relative humidity of regeneration fluid in the regeneration fluid path.

In some embodiments of the present methods, the controlling comprises controlling at least a speed of a blower to adjust a flow rate of air through the process airflow path to optimize liquid water production.

In some embodiments of the present methods, the controlling comprises controlling at least a speed of a circulator to adjust a flow rate of regeneration fluid through the regeneration fluid path to optimize liquid water production.

Some embodiments of the present methods further comprise: absorbing sunlight with the thermal unit to heat regeneration fluid in the regeneration fluid path.

Some embodiments of the present methods further comprise: communicating air in the process airflow path through the condenser to transfer thermal energy from regeneration fluid in the regeneration fluid path to air in the process airflow path.

Some embodiments of the present methods further comprise: collecting liquid water produced by the condenser.

Some embodiments of the present methods further comprise: filtering liquid water produced by the condenser.

Some embodiments of the present methods further comprise: dissolving additives into liquid water produced by the condenser.

Some embodiments of the present methods further comprise: transferring, with a second desiccant, water from regeneration fluid in the regeneration fluid path downstream of the condenser to regeneration fluid in the regeneration fluid path upstream of the condenser.

In some embodiments of the present methods, a flow rate of air in the process airflow path is at least 5 times a flow rate of regeneration fluid in the regeneration fluid path.

In some of the present embodiments, the desiccant wheel may also act as an enthalpy wheel that is configured to transfer (and in use transfers) heat from one path of the regeneration fluid to another.

As used in this disclosure, the terms "adsorption" and "absorption," and the like, may be interchangeable. While it is generally appreciated that absorption is a bulk phenomenon and adsorption is a surface-based phenomenon, the desiccants and/or sorption mediums of the present disclosure may capture water vapor by adsorption, absorption, or a combination thereof.

The term "coupled" is defined as connected, although not necessarily directly, and not necessarily mechanically. The terms "a" and "an" are defined as one or more unless this disclosure explicitly requires otherwise. The term "substantially" is defined as largely but not necessarily wholly what is specified (and includes what is specified; e.g., substantially 90 degrees includes 90 degrees and substantially parallel includes parallel), as understood by a person of ordinary skill in the art. In any disclosed embodiment, the terms "substantially" and "approximately" may be substituted with "within [a percentage] of" what is specified, where the percentage includes 0.1, 1, 5, and 10%.

Further, a device or system that is configured in a certain way is configured in at least that way, but it can also be configured in other ways than those specifically described.

The terms "comprise" (and any form of comprise, such as "comprises" and "comprising"), "have" (and any form of have, such as "has" and "having"), "include" (and any form of include, such as "includes" and "including"), and "contain" (and any form of contain, such as "contains" and "containing") are open-ended linking verbs. As a result, an apparatus that "comprises," "has," "includes," or "contains" one or more elements possesses those one or more elements, but is not limited to possessing only those elements. Likewise, a method that "comprises," "has," "includes," or "contains" one or more steps possesses those one or more steps, but is not limited to possessing only those one or more steps.

Any embodiment of any of the apparatuses, systems, and methods can consist of or consist essentially of—rather than comprise/include/contain/have—any of the described steps, elements, and/or features. Thus, in any of the claims, the term "consisting of" or "consisting essentially of" can be substituted for any of the open-ended linking verbs recited above, in order to change the scope of a given claim from what it would otherwise be using the open-ended linking verb.

The feature or features of one embodiment may be applied to other embodiments, even though not described or illustrated, unless expressly prohibited by this disclosure or the nature of the embodiments.

Some details associated with the embodiments described above and others are described below.

DESCRIPTION OF THE DRAWINGS

The following drawings illustrate by way of example and not limitation. For the sake of brevity and clarity, every feature of a given structure is not always labeled in every figure in which that structure appears. Identical reference numbers do not necessarily indicate an identical structure. Rather, the same reference number may be used to indicate a similar feature or a feature with similar functionality, as may non-identical reference numbers. Views in the figures are drawn to scale (unless otherwise noted), meaning the sizes of the depicted elements are accurate relative to each other for at least the embodiment in the view.

DESCRIPTION OF ILLUSTRATIVE EMBODIMENTS

Figure 1:
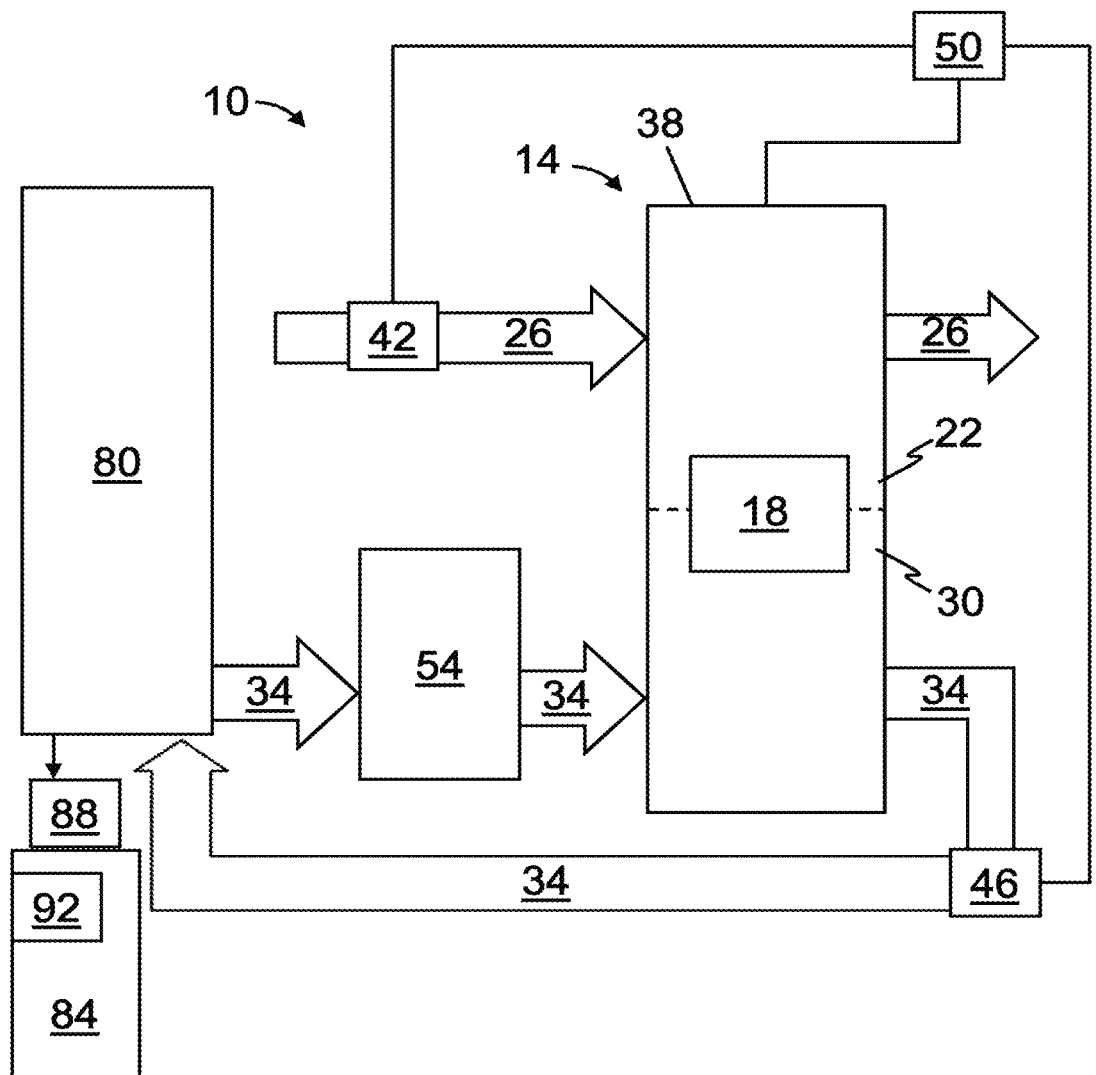
FIG. 1 is a diagram of an embodiment of the present systems for generating liquid water from air.

Referring now to the drawings, and more particularly to FIG. 1, shown therein and designated by the reference numeral 10 is a first embodiment of the present systems for generating liquid water from air. In the embodiment shown, system 10 is configured to function responsive to diurnal variations. For example, as described in more detail below, system 10 is configured to control one or more operational parameters (e.g., control and/or controlled variables) based on one or more diurnal variations (e.g., variations in ambient air temperature, ambient air relative humidity, solar insolation, and/or the like).

Figure 17A:
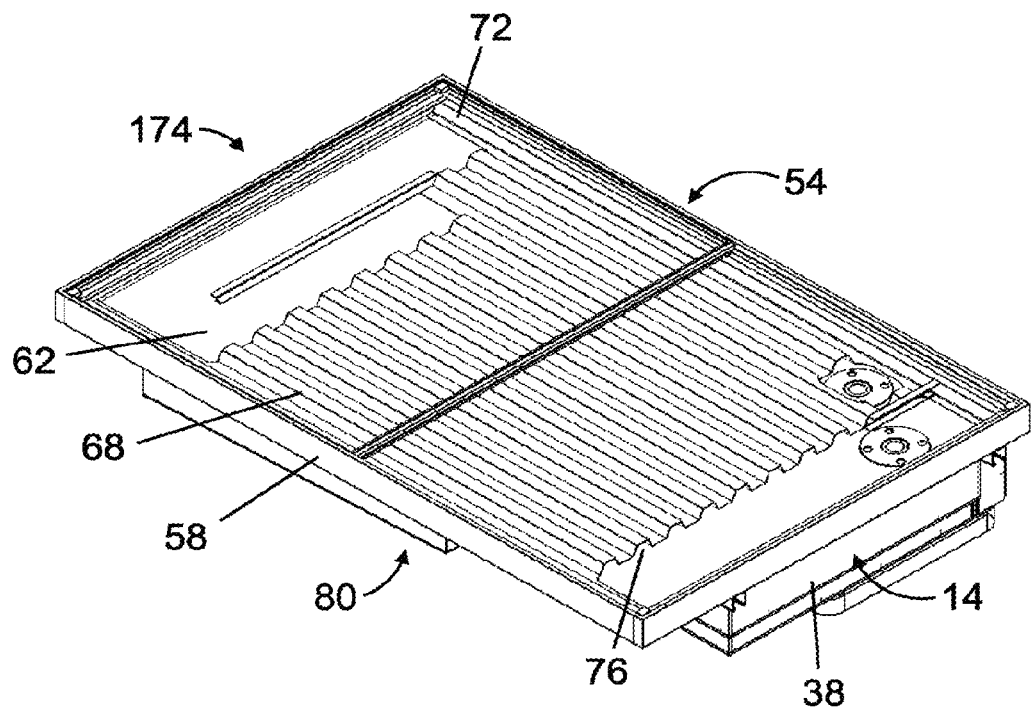
FIG. 17A is a top perspective view of an embodiment of the present systems for generating liquid water from air.
Figure 17B:
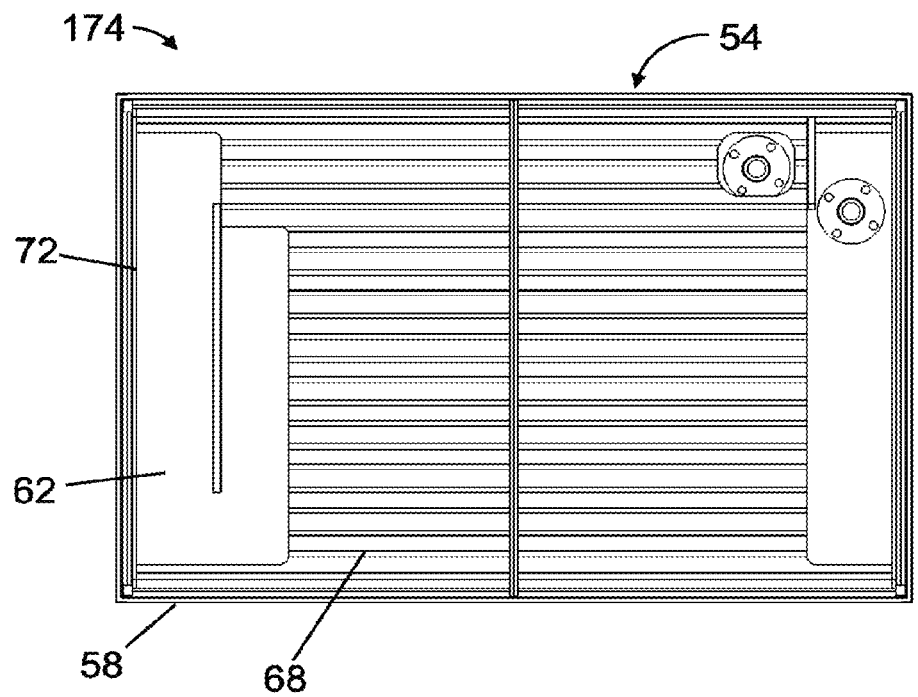
FIGS. 17B and 17C are top and bottom views, respectively, of the system of FIG. 17A.
Figure 17C:
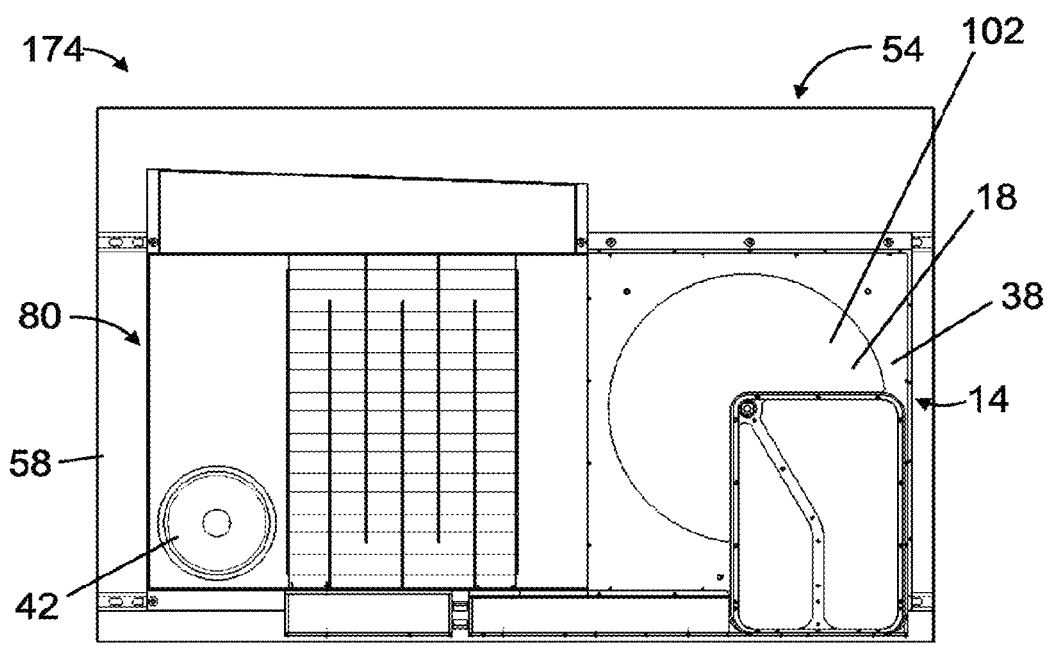

Throughout the following description, illustrative views of example components which may be suitable for use in some of the systems described below (e.g., 10, 98) are provided in FIGS. 17A-17C, which collectively depict an embodiment 174 of the present systems. The views of system 174, shown in FIGS. 17A-17C, are provided only by way of illustration, and not by way of limitation. In other words, FIGS. 17A-17C may be used to illustrate and/or provide additional description of certain components of systems 10 and/or 98, but shall not be used to limit systems 10 and/or 98.

In this embodiment, system 10 comprises a desiccant unit 14. In the depicted embodiment, desiccant unit 14 comprises a desiccant (e.g., sorption medium) 18, where the desiccant 18 (e.g., or a portion thereof) is selectively (e.g., and/or alternatively) movable between an adsorption zone 22, in which the desiccant is in fluid communication with a process air pathway (e.g., a process airflow path) 26 and a desorption zone 30, in which the desiccant is in fluid communication with a (e.g., closed-loop) regeneration fluid pathway (e.g., a regeneration fluid path) 34. In some embodiments, the adsorption and desorption zones may be defined by a housing (e.g., 38) of the desiccant unit.

In the embodiment shown, desiccant unit 14 operates in a continuous, or non-batch, fashion. As used in this disclosure, the term "continuous," or "non-batch," may be used to refer to a desiccant unit (e.g., 14) configured to absorb water and desorb water substantially simultaneously or simultaneously. On the other hand, the terms "non-continuous," or "batch," may be used to refer to a desiccant unit wherein absorption of water and desorption of water are essentially consecutive operations (e.g., such that water storage in the desiccant or storage medium for a significant period of time may be necessary to reach viable liquid water production rates). For example, in the depicted embodiment, system 10 is configured such that a first portion of desiccant 18 can be disposed within adsorption zone 22 (e.g., such that the first portion can capture water from process air in process air pathway 26), with a second portion of the desiccant simultaneously disposed within the desorption zone (e.g., such that the second portion can desorb water into regeneration fluid in regeneration fluid pathway 34). Regeneration fluids suitable for use in some embodiments of the present systems include, but are not limited to, air (e.g., including any suitable amount of water vapor), super-saturated or high relative humidity gas (e.g., 90-100% relative humidity), glycols, ionic liquids, and/or the like.

As described above, in the embodiment shown, desiccant unit 14 may comprise a hygroscopic material (e.g., desiccant or sorption medium 18) configured to continuously alternate between a process air pathway 26 and a regeneration fluid pathway 34. In some embodiments, it may be desirable that the desiccant or sorption medium be capable of quickly desorbing water back into low relative humidity air (e.g., to regenerate the desiccant). Therefore, in some embodiments, the performance of the desiccant or sorption medium may be driven by an ability to quickly cycle through an absorption state and a desorption state.

Desiccants (e.g., 18) of the present systems can comprise any suitable medium in any suitable configuration (e.g., such that the desiccant or sorption medium is capable of adsorption and desorption of water). The follow description of desiccants and sorption mediums is provided only by way of example. In some embodiments, the desiccant or sorption medium is capable of sorption at a first temperature and/or pressure and desorption at a second temperature and/or pressure. Suitable desiccants or sorption mediums may comprise liquids, solids, and/or combinations thereof. In some embodiments, desiccants or sorption mediums may comprise any suitable porous solid impregnated with hygroscopic materials. For example, in the embodiment shown, desiccant 18 may comprise one or more materials selected from the group consisting of: silica, silica gel, alumina, alumina gel, montmorillonite clay, zeolites, molecular sieves, activated carbon, metal oxides, lithium salts, calcium salts, potassium salts, sodium salts, magnesium salts, phosphoric salts, organic salts, metal salts, glycerin, glycols, hydrophilic polymers, polyols, polypropylene fibers, cellulosic fibers, derivatives thereof, and combinations of thereof. In some embodiments, the desiccant or sorption medium may be selected and/or configured to avoid sorption of certain molecules (e.g., those molecules that may be poisonous when consumed by a human).

In some embodiments, desiccant particles may be packed in a shallow bed to maximize a surface area for interaction with air or fluid within adsorption zone 22 and desorption zone 30. In some embodiments, the desiccant particles may be agglomerated via a binder. In some embodiments, the desiccant particles may be dyed black (e.g., to improve absorption of thermal radiation). In some embodiments, the desiccant particles may be mixed and/or combined with thermal radiation absorbing materials.

In the depicted embodiment, system 10 includes one or more blowers (e.g., 42) and/or one or more circulators (e.g., 46). For example, in this embodiment, blower 42 is disposed in process air pathway 26 and is configured to adjust a flow rate of air through the process air pathway. Circulator 46, in this embodiment, is disposed in regeneration fluid pathway 34 and is configured to adjust a flow rate of fluid through the regeneration fluid pathway. In some embodiments, blower 42 and/or circulator 46 may be controlled by controller 50 (e.g., controlling a speed of blower 42 and/or circulator 46 to optimize liquid water production). In some embodiments, blower 42 and/or circulator 46 may be configured to substantially maintain a pre-determined flow rate through process air pathway 26 and/or regeneration fluid pathway 34, respectively.

In the embodiment shown, system 10 comprises a thermal unit 54 configured to provide thermal energy to fluid in regeneration fluid pathway 34 (e.g., such that desiccant 18 may be regenerated). In this embodiment, thermal unit 54 is a solar thermal unit (e.g., is configured to convert solar insolation to thermal energy). While the present systems may comprise any suitable thermal unit, whether solar or otherwise, the following description of thermal unit 54 is provided by way of example.

In the embodiment shown, thermal unit 54 comprises a transparent layer 62 configured to allow sunlight to enter casing 58 of the thermal unit (e.g., a sheet of transparent material, a lens, and/or the like, whether comprising glass, polymers, polycrystalline materials, derivatives thereof, combinations thereof, and/or the like). In embodiments comprising a glass transparent layer 62, the glass may be configured to maximize transmissivity (e.g., low-iron and/or no-iron materials, and/or other compositions, uncoated materials, and/or the like). Transparent layers of the present systems may be comprised of multiple layers (e.g., multi-pane layers, such as, for example, double-paned glass).

In this embodiment, thermal unit 54 comprises an absorber 68 configured to absorb thermal energy from the sunlight and provide at least a portion of the absorbed thermal energy to fluid in the regeneration fluid pathway (e.g., absorber 68 comprises a thermally permeable material). Absorbers of the present disclosure can comprise any suitable material, such as, for example, metals (e.g. aluminum, copper, steel), thermally stable polymers, or other material, and/or the like. Absorbers may be substantially flat, roughened, channeled or for example, corrugated as depicted in FIG. 17A-17B. In some embodiments, a matte black coating or selective film may be applied to the surface of the absorber material. In the embodiment shown, absorber 68 is configured to transfer thermal energy to fluid in the regeneration fluid pathway without an intervening heat transfer fluid; however, in other embodiments, a fluid (e.g., liquid, gas, and/or the like) may be thermally disposed between the absorber and fluid in the regeneration fluid pathway (e.g., to function as a medium to transfer heat between the absorber and fluid in the regeneration fluid pathway).

In the depicted embodiment, thermal unit 54 comprises an insulator 72 configured to insulate at least a portion of casing 58. In this way, solar insolation may enter the casing of thermal unit 54 (e.g., through transparent layer 62), and insulator 72 may insulate a portion of the casing to, for example, minimize thermal energy losses to an environment outside of the thermal unit. Insulator(s) of the present system may be comprised of any suitable material (e.g., a material capable of resisting the flow of thermal energy), such as, for example, a solid foam comprising trapped pockets of gas and/or liquid. In some embodiments, insulators be selected and/or configured for stability at high temperatures (e.g., temperatures exceeding 200° C.).

In the embodiment shown, one or more channels 76 may be disposed in thermal communication with absorber 68 such that the absorber may transfer absorbed thermal energy to fluid (e.g., regeneration fluid, a flowable heat carrier medium, and/or the like) within the one or more channels. In this embodiment, one or more channels 76 form part of regeneration fluid pathway 34 (e.g., one or more channels 76 are configured to convey regeneration fluid). One or more channels 76 of the present systems may comprise any suitable structure, such as, for example, tubular hollow bodies or a plurality of flat plates adapted for fluid flow therebetween, and/or the like.

In this embodiment, system 10 comprises a condenser 80 configured to receive fluid from the desorption zone via the regeneration fluid pathway and produce liquid water from the received fluid (e.g., by condensing water vapor in fluid in the regeneration fluid pathway). Condensers of the present disclosure may comprise any suitable material and comprise any suitable configuration (e.g., to condense water vapor in regeneration fluid into liquid water). For example, suitable condensers may comprise polymers, metals, and/or the like. For further example, suitable condensers may comprise coils, fins, plates, tortuous passages (as depicted in the example of FIG. 17C), and/or the like. In the embodiment shown, condenser 80 is configured to transfer thermal energy from fluid in regeneration fluid pathway 34 downstream of desiccant 18 to air in process air pathway 26 upstream of desiccant 18 (e.g., such that air in process air pathway 26 may facilitate cooling of condenser 80). In some embodiments, condenser 80 may be cooled by ambient air.

In the depicted embodiment, system 10 comprises a water collection unit 84 configured to receive liquid water produced by condenser 80. In this embodiment, liquid water produced by the condenser is provided to water collection unit 84 by way of gravity; however, in other embodiment, flow of liquid water from the condenser to the water collection unit may be assisted (e.g., by one or more pumps, any other suitable delivery mechanism, and/or the like).

In some embodiments, system 10 comprises a filter 88 (e.g., a filtration membrane), which, in some embodiments, may be positioned between condenser 80 and water collection unit 84 (e.g., to reduce an amount of impurities, such as, for example, sand, bacteria, fibrous, carbonaceous species, and/or the like, which may be present in liquid water produced by condenser 80).

In some embodiments, water collection unit 84 (e.g., or filter 88 thereof) may comprise an ultraviolet (UV) light source (e.g., for disinfection of water produced by condenser 80). In some embodiments, suitable light sources may comprise light emitting diodes (LEDs) having, for example: wavelengths below 400 nanometers (nm) (e.g., 385 nm, 365 nm, and/or the like), wavelengths below 300 nm (e.g., 265 nm), and/or the like.

In some embodiments, a water collection unit (e.g., 84) may comprise one or more water level sensors (e.g., 122*e*). Such water level sensors may comprise conductance sensors (e.g., open and/or closed circuit resistance-type conductance sensors), which may operate via conductivity measurement of water in the range of 0.1 msiemens per cm.

In the embodiment shown, water collection unit 84 comprises a receptacle 92 configured to receive one or more additives for introduction to the produced liquid water. Such additives may be configured to dissolve slowly into liquid water stored in the water collection unit. Additives suitable for use in the present systems include, but are not limited to, minerals, salts, other compounds, and/or the like. In some embodiments, additives may impart flavor to the produced liquid water. To illustrate, such additives may be selected from the group consisting of: potassium salts, magnesium salts, calcium salts, fluoride salts, carbonate salts, iron salts, chloride salts, silica, limestone, and/or combinations thereof.

In some embodiments, the present systems may comprise indicators (e.g., lights, such as, for example, LEDs), which may be configured to provide information regarding system operation. For example, in some embodiments, indicator lights may be configured to provide information (e.g., visually, for example, to a user) that the system is running, that solar power (e.g., from power unit 118) is available, that an air filter (e.g., within process air pathway 26) may need to be changed, that a water collection unit (e.g., 84) is full (e.g., in some embodiments, that the water collection unit contains 20 L of liquid water), that an actuator (e.g., actuator 114, blower 42, circulator 46, and/or the like) has failed and/or is failing, that telematics errors (e.g., as indicated by transceiver 126 operation) have and/or are occurring, and/or the like. As will be described below, any suitable information (including the information described above with reference to indicators), may be transmitted over a communications network (e.g., alone and/or in addition to operation of any indicators).

In this embodiment, a controller (e.g., processor) 50 controls exposure of desiccant 18 (or a portion thereof) to air in process air pathway 26 and regeneration fluid in regeneration fluid pathway 34 (e.g., to increase and/or optimize the liquid water ultimately produced by condenser 80), and such control may vary over a diurnal cycle (e.g., in response to diurnal variations). Such variations in environmental conditions (e.g., inputs into controller 50) can include, for example, ambient air temperature, ambient air relative humidity, and solar insolation. Other inputs to controller 50 can include, for example, an amount of thermal energy generated by thermal unit 54, a relative humidity of air in process air pathway 26, a relative humidity of fluid in regeneration fluid pathway 34, a temperature of fluid in the regeneration fluid pathway between desiccant 18 and thermal unit 54, a rate of water production, and/or the like. In embodiments that include a purge airflow path (e.g., 130), inputs to controller 50 may include a flow rate, temperature, relative humidity and/or the like of air in the purge airflow path. In the embodiment shown, controller 50 is configured to optimize liquid water production by controlling a rate of desiccant 18 movement between the adsorption zone and the desorption zone, controlling a speed of blower 42 and/or circulator 46, and/or the like, based, on measurements of one or more of such inputs (e.g., such that controller 50 may optimize liquid water production based on current environmental and system conditions). As described in more detail below, inputs to controller 50 may be measured in that they are indicated in data captured by one or more sensors (e.g., 122).

Figure 2:
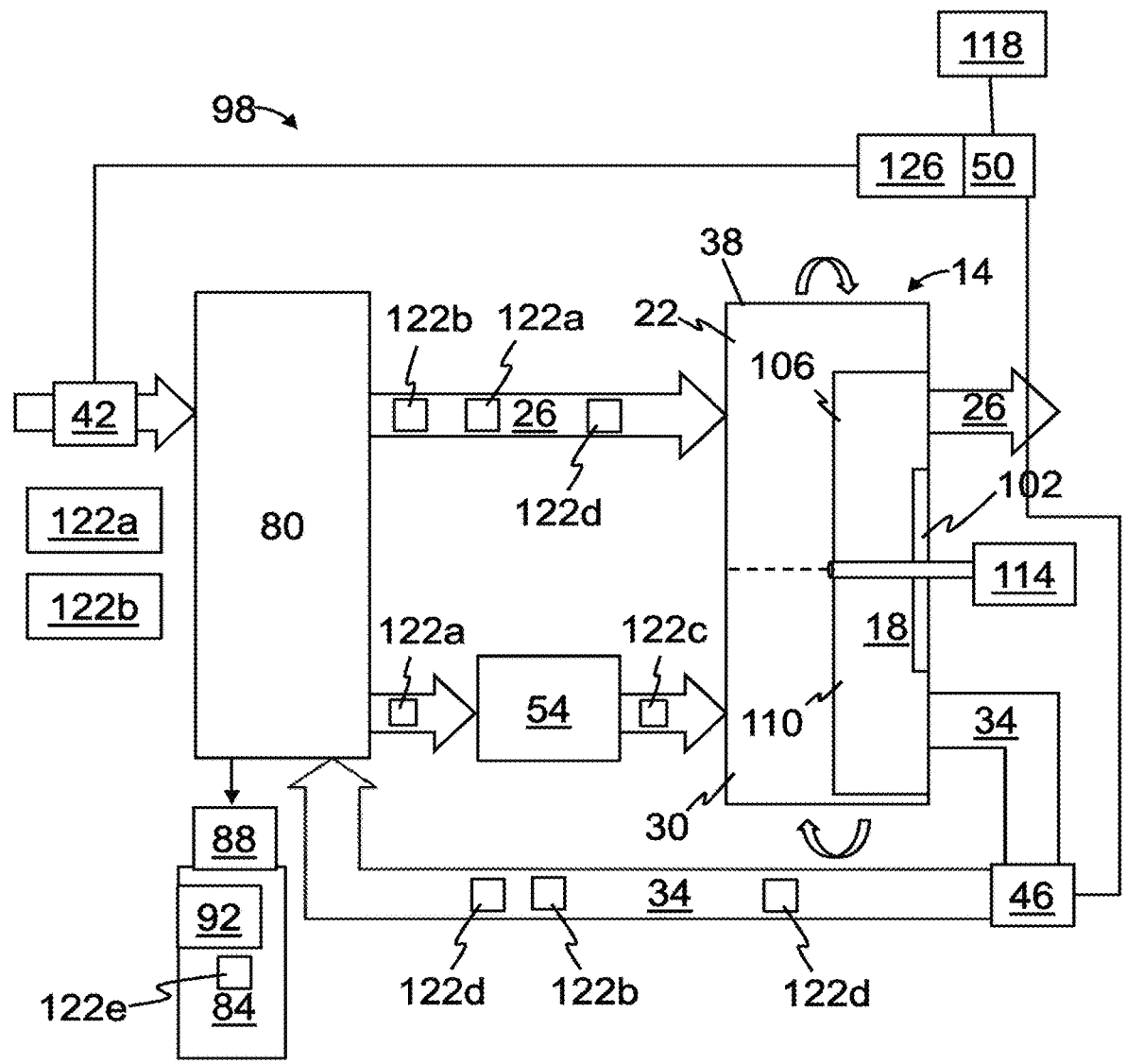
FIG. 2 is a diagram of an embodiment of the present systems for generating liquid water from air.

FIG. 2 is a diagram of an embodiment 98 of the present systems for generating liquid water from air. System 98 may be substantially similar to system 10, with the primary differences and/or additions described below. Otherwise, system 98 may comprise any and/or all features described with respect to system 10.

In system 98, as with system 10, desiccant 18 (or a first portion thereof) can be in fluid communication with process air in process air pathway 26 while the desiccant 14 (or a second portion thereof) is simultaneously in fluid communication with regeneration fluid in regeneration fluid pathway 34, and, thus, desiccant unit 14 operates in a continuous and non-batch manner. In this embodiment, sections of desiccant 18 are each exposed to air in process air pathway 26 and fluid in regeneration fluid pathway 34 in an alternating manner.

In the embodiment shown, system 98 comprises a rotatable disk 102 (e.g., with desiccant 18 disposed thereon). In this embodiment, desiccant 18 (or sections thereof) are configured to move between the adsorption zone and the desorption zone as disk 102 is rotated. For example, in the embodiment shown, in the depicted orientation of disk 102, a portion 106 of the desiccant is in communication with process air pathway 26, and a portion 110 of the disk is in communication with regeneration fluid pathway 34. In the depicted embodiment, system 98 comprises an actuator (e.g., electrical motor) 114 configured to cause rotation of disk 102. In this embodiment, controller 50 is configured to optimize liquid water production at least by controlling movement (e.g., through control of actuator 114) of desiccant 18 (e.g., disk 102) between the adsorption zone and the desorption zone; however, in other embodiments, motor 114 may rotate disk 102 at a predetermined rotation rate.

In the embodiment shown, system 98 comprises a solar power unit 118 configured to provide power to at least a portion of system 98 (e.g., blower 42, circulator 46, actuator 114, and/or the like). In this embodiment, solar power unit 118 is configured to convert solar insolation to electrical power (e.g., solar power unit 118 comprises a solar panel). For example, in the depicted embodiment, solar power unit 118 may be provided as a photovoltaic solar panel comprising semiconducting materials exhibiting a photovoltaic effect. In these and similar embodiments, controller 50 may be configured to control system 98 in response to diurnal variations in solar insolation (e.g., an amount of electrical power generated by solar power unit 118).

In some embodiments, the present systems for generating liquid water from air may be modular in nature. For example, the present systems may be configured such that each component (e.g. solar power unit 118, thermal unit 54, desiccant unit 14, condenser 80, water collection unit 84, and/or the like) may be separated from one another, transported, assembled and/or re-assembled with one another (e.g., in a same or a different configuration), and/or the like in a relatively simple manner (e.g., some embodiments of the present systems and components thereof are modular in nature). For example, in some embodiments, the system is configured such that no dimension of any singular component (e.g., water collection unit 84, desiccant unit 14, solar power unit 118, thermal unit 54, condenser 80, and/or the like) is larger than six to eight feet (e.g., to facilitate transport of the system or components thereof, for example, in a single cab truck bed, such as a bed of a Toyota Hilux pickup truck) (e.g., each component has a footprint that is less than or equal to 64 square feet ($ft^2$) and/or each component can be contained within a cubic volume less than or equal to 512 cubic feet (ft)).

In the embodiment shown, controller 50 is configured to control one or more of blower 42, circulator 46, actuator 114, and/or the like (e.g., to optimize liquid water production, where such control may be in response to diurnal variations, for example, in ambient temperature, ambient air relative humidity, solar insolation, and/or the like). For example, controller 50 may be configured to increase a rate of liquid water production by controlling blower 42, circulator 46, actuator 114, and/or the like, taking into account, for example, diurnal variations. To illustrate, such variations may change the amount of thermal energy generated by thermal unit 54, the level of electrical power provided by solar power unit 118, the level of humidity in process air entering the system, and/or the like. In some embodiments, ambient conditions can be measured in real-time or can be forecast based on, for example, historical averages and/or the like. In embodiments in which controller 50 receives real-time measurements, various sensors (described in more detail below) may provide data indicative of ambient conditions to controller 50 (e.g., continuously, periodically, when requested by controller 50, and/or the like).

In this embodiment, controller 50 may operate the system based on one or more of: a user selection, data received from one or more sensors, programmatic control, and/or by any other suitable means. In the depicted embodiment, for example, controller 50 may be associated with peripheral devices (including sensors) for sensing data information, data collection components for storing data information, and/or communication components for communicating data information relating to the operation of the system.

In the depicted embodiment, system 98 comprises one or more peripheral devices, such as sensors 122 (e.g., temperature sensors 122a, humidity sensors 122b, solar insolation sensor 122c, flow rate sensors 122d, water level sensors 122e, and/or the like). In some embodiments, one or more sensors (e.g., 122) may provide data indicative of ambient air temperature, ambient air relative humidity, solar insolation, process air temperature, regeneration fluid temperature, process air relative humidity, regeneration fluid relative humidity, process air flow rate, regeneration fluid flow rate, liquid water production rate, water usage rate, and/or the like.

In some embodiments, one or more sensors 122 may be located remotely from other components of the system, and may provide captured data to the other components of the system via a wired and/or wireless connection. For example, a town, village, city, and/or the like may include a plurality of the present systems, and one of the plurality of the present systems may provide data indicative of ambient environmental conditions (e.g., air temperature, air relative humidity, a solar insolation level, and/or the like) to another one of the plurality of the present systems. In this way, in some embodiments, a single sensor 122 may be shared by multiple systems. In some embodiments, data communicated to a controller (e.g., 50) by one or more peripheral devices (e.g., one or more sensors 122) may be stored in a data logging unit.

In the embodiment shown, system 98 comprises a telematics unit (e.g., a transmitter, receiver, transponder, transverter, repeater, transceiver, and/or the like, sometimes referred to herein as "transceiver 126"). For example, in this embodiment, a transceiver 126 is configured to communicate data to and/or from the system (e.g., controller 50) via a wired and/or wireless interface (e.g., which may conform to standardized communications protocols, such as, for example, GSM, SMS components operating at relatively low rates (e.g., operating every few minutes), protocols that may be geographically specified, and/or the like).

In some embodiments, a transceiver (e.g., 126) may be associated with a server and a communications network for communicating information between the server and the transceiver (e.g., and thus the system and/or a controller 50 thereof). By way of illustration, such two-way communication may be facilitated by a cellular tower in cellular range of the system. In some embodiments, a database (e.g., which may be remote from the system) may be configured to store information received from the server over the communications network.

In embodiments with telematics capability, a network administrator or device owner may send a command to a controller (e.g., 50) to update or delete look-up table data (described below) and/or a control algorithm. In this way, data security may be maintained, for example, in the case that the system is stolen or otherwise lost.

In the embodiment shown, controller 50 is configured to vary operation of system 98 at least based on real-time and/or forecast variations in ambient conditions. For example, controller 50 can control exposure of desiccant 18 (e.g., or sections thereof) to process air and regeneration fluid in response to changes in ambient conditions (e.g., by changing the rotational speed of disk 102, such that the time that a portion of desiccant 18 disposed thereon is exposed to process air in process air pathway 26 or regeneration fluid in regeneration fluid pathway 34 may be increased or decreased). In some embodiments, a controller (e.g., 50) may be configured to vary a size of an adsorption zone or a desorption zone (e.g., in response to diurnal variations).

Figure 3A:
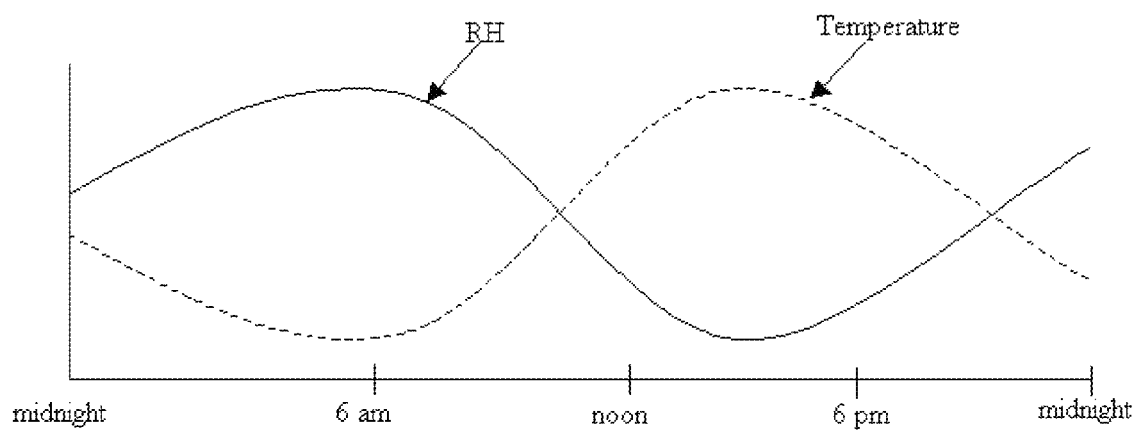
FIG. 3A is a graph of diurnal variations in environmental conditions over one day, including ambient air relative humidity ("RH") and temperature.
Figure 3B:
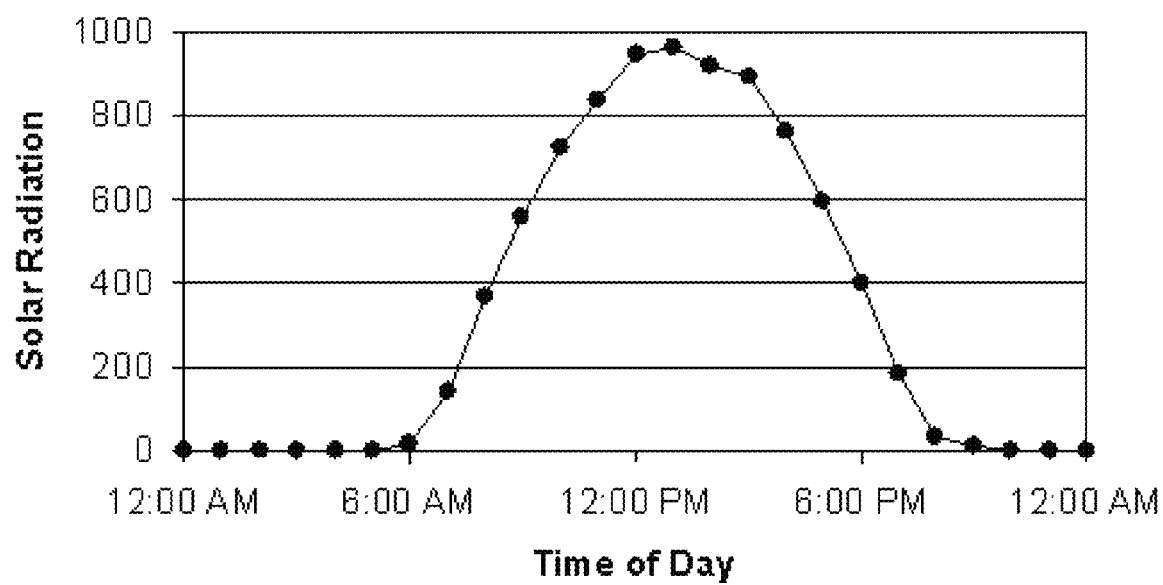
FIG. 3B is a graph of diurnal variations in environmental conditions over one day, including solar radiation (e.g., solar insolation).

FIG. 3A is a graph of diurnal variations in environmental conditions over one day, including ambient air relative humidity ("RH") and temperature. FIG. 3B is a graph of diurnal variations in environmental conditions over one day, including solar radiation (e.g., solar insolation). In general and as shown, during nighttime hours, ambient air relative humidity is relatively high and ambient temperature is relatively low. As the sun rises, solar insolation generally increases (e.g., peaking around noon), which may result in a decrease in ambient air relative humidity and an increase in ambient temperature. At a certain point during the day, ambient air relative humidity may reach a minimum, and, at a certain point during the day, ambient temperature may increase to a maximum, and these points may generally coincide. Finally, as the sun begins to set, ambient air relative humidity may tend to increase, and ambient temperature may tend to decrease (e.g., as solar insolation approaches its minimum during nighttime hours).

As shown, a particular set of environmental conditions may exist at each point in a diurnal cycle (e.g., ambient air relative humidity, ambient temperature, solar insolation, and/or the like). Some embodiments of the present systems are configured to vary operational parameters (e.g., control variables) of the system, taking into account variations in these environmental conditions, thus optimizing system performance (e.g., liquid water production) for each point of the diurnal cycle. By way of illustration, in the early part of a day, solar insolation may be relatively limited. Thus, in some embodiments, the system (e.g., or a controller 50 thereof) may adjust operational parameters to account for a relatively low amount of available solar thermal energy and/or a relatively low amount of electrical power available from solar power units, despite the relative high ambient air relative humidity. For example, in these circumstances, a controller may cause a desiccant to move more slowly between an adsorption zone and a desorption zone due to the relatively low amount of thermal energy and/or solar power available, despite the relatively high levels of ambient air relative humidity in available process air. On the other hand, later in the day, the controller may adjust operational parameters to account for a relatively low amount of ambient air relative humidity, despite a relatively high amount of available solar thermal energy and/or a relatively high amount of electrical power available from solar power units (e.g., due to a relatively high amount of solar insolation). Controllers of the present disclosure can make such adjustments to operational parameters periodically and/or continuously.

Figure 4:
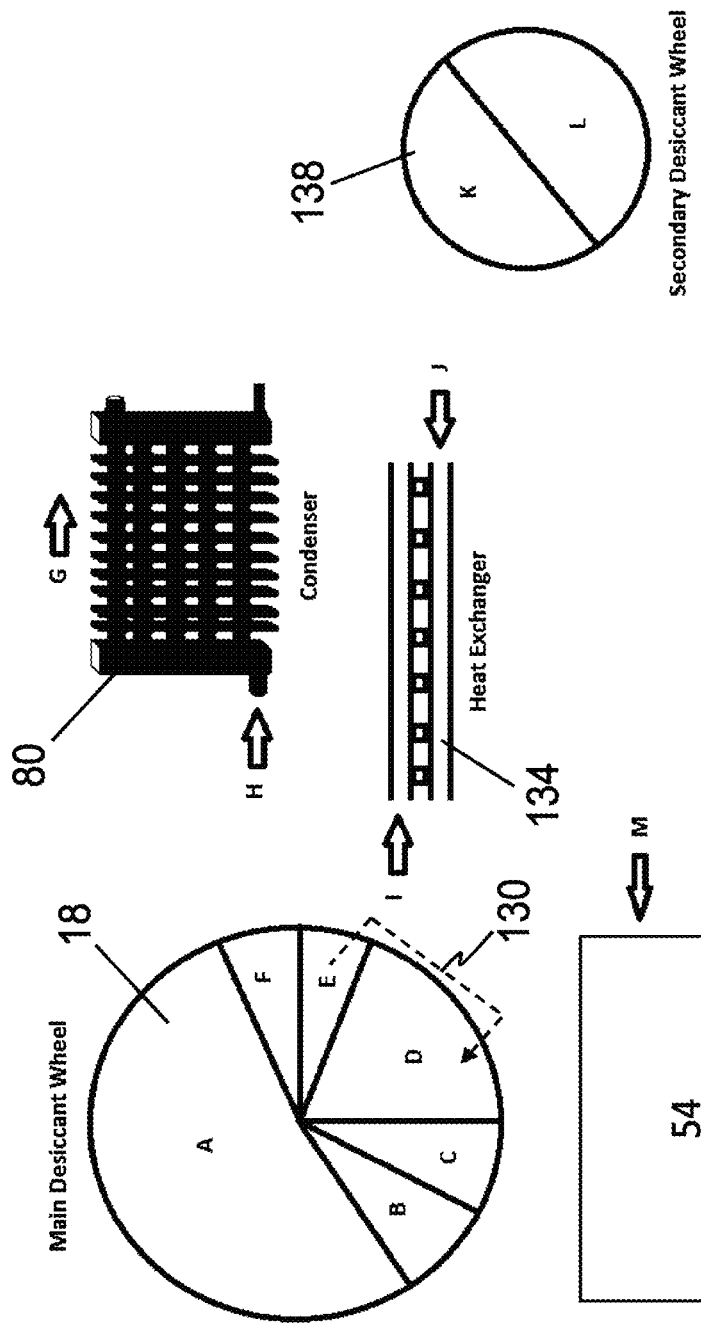
FIG. 4 is a diagram illustrating exemplary flow paths through some embodiments of the present systems for generating liquid water from air.

FIG. 4 is a diagram illustrating exemplary flow paths through some embodiments of the present systems for generating liquid water from air. Embodiments of the present systems for generating liquid water from air can comprise any suitable flow path (e.g., process air pathway and/or regeneration fluid pathway), including, for example, those described below (e.g., whether alone and/or in combination), which are provided merely by way of example.

In some embodiments, air within the process air pathway may enter the system from an outside environment, communicate with sections A, B, C, E, and F of a desiccant (e.g., 18) (e.g., such that the desiccant or sections thereof may absorb water from the air in the process air pathway), pass through a condenser (e.g., 80) (e.g., where air in the process air pathway may be heated by thermal energy from fluid in the regeneration fluid pathway), and be exhausted to the outside environment. In these and similar embodiments, regeneration fluid may pass through a condenser (e.g., 80) (e.g., where fluid in the regeneration fluid pathway may transfer thermal energy to air in the process air pathway), pass through a thermal unit (e.g., 54) (e.g., where fluid in the regeneration fluid pathway may be heated), communicate with section D of a desiccant (e.g., 18) (e.g., such that the desiccant or sections thereof may release water to fluid in the regeneration fluid pathway), and flow back through the condenser (e.g., such that the condenser may produce liquid water from fluid in the regeneration fluid pathway).

In some embodiments, the present systems may include a purge airflow path 130 configured to transfer thermal energy from regeneration fluid in a regeneration fluid pathway downstream of a desiccant (e.g., 18) to fluid in the regeneration fluid pathway upstream of the condenser. For example, in these and similar embodiments, process air may enter the system from an outside environment, communicate with sections A, B, and F of a desiccant (e.g., 18), pass through a condenser (e.g., 80), and be exhausted to the outside environment. In these and similar embodiments, regeneration fluid may pass through a condenser (e.g., 80), pass through a thermal unit (e.g., 54), communicate with section D of a desiccant (e.g., 18), and flow back through the condenser. In these and similar embodiments, air in a purge airflow path 130 may communicate between section E of a desiccant (e.g., 18) and section D of the desiccant (e.g., to transfer heat from section D of the desiccant, which may be provided to section D of the desiccant by regeneration fluid within the regeneration fluid pathway flowing from a thermal unit (e.g., 54) to section E of the desiccant) (e.g., to perform a pre-heating operation before section E of the desiccant moves into a desorption zone).

Some embodiments of the present systems comprise a recovery heat exchanger 134 configured to transfer thermal energy from regeneration fluid in a regeneration fluid pathway downstream of a desiccant (e.g., 18) to fluid in the regeneration fluid pathway upstream of the condenser. For example, in these and similar embodiments, process air may enter the system from an outside environment, communicate with sections A, B, C, E, and F of a desiccant (e.g., 18), pass through a condenser (e.g., 80), and be exhausted to the outside environment. In these and similar embodiments, regeneration fluid may pass through a condenser (e.g., 80), pass through a heat exchanger (e.g., such that the heat exchanger may transfer thermal energy from fluid in the regeneration fluid pathway downstream of the desiccant to fluid in the regeneration fluid pathway upstream of the condenser), pass through a thermal unit (e.g., 54), communicate with section D of the desiccant, flow back through the heat exchanger, and flow back through the condenser. In this way, thermal energy that may otherwise be lost to the environment through the condenser may be at least partially recovered to be used for desorption purposes.

Some embodiments of the present systems comprise a second desiccant 138 (e.g., which may be disposed on a disk, similarly to as described above for desiccant 18) configured to transfer water from fluid in the regeneration fluid pathway downstream of a condenser (e.g., 80) to fluid in the regeneration fluid pathway upstream of the condenser, and may also transfer heat from one path of the regeneration fluid to another. For example, in these and similar embodiments, process air may enter the system from an outside environment, communicate with sections A, B, C, E, and F of a desiccant (e.g., 18), pass through a condenser (e.g., 80), and be exhausted to the outside environment. In these and similar embodiments, regeneration fluid may pass through a condenser (e.g., 80), communicate with section L of a second desiccant (e.g., 138) (e.g., such that desiccant 138 may capture water in fluid in the regeneration fluid pathway before the fluid in the regeneration fluid pathway enters thermal unit 54), pass through a thermal unit (e.g., 54), communicate with section D of the desiccant, communicate with section K of the second desiccant (e.g., such that desiccant 138 may release water to fluid in the regeneration fluid pathway before fluid in the regeneration fluid pathway enters condenser 80), and flow back through the condenser.

Some embodiments may achieve at least some of the functionality described above for a regeneration fluid pathway in communication with a second desiccant (e.g., 138), without requiring a second desiccant. For example, in some embodiments, process air may enter the system from an outside environment, communicate with sections A, E, and F, of a desiccant (e.g., 18), pass through a condenser (e.g., 80), and be exhausted to the outside environment. In these and similar embodiments, regeneration fluid may pass through a condenser (e.g., 80), communicate with section C of a desiccant (e.g., 18), pass through a thermal unit (e.g., 54), communicate with section D of the desiccant, communicate with section B of the desiccant, and flow back through the condenser.

In some embodiments, process air may enter the system from an outside environment, communicate with section A, E, and F of a desiccant (e.g., 18), pass through a condenser (e.g., 80), and be exhausted to an outside environment. In these and similar embodiments, regeneration fluid may pass through a condenser (e.g., 80), communicate with section C of a desiccant (e.g., 18), pass through a thermal unit (e.g., 54), communicate with section D of the desiccant, and flow back through the condenser. Such embodiments may achieve at least some of the benefits of embodiments having a recovery heat exchanger (e.g., 134) or a purge airflow path (e.g., 130).

In some embodiments, process air may enter the system from an outside environment, communicate with sections A, B, E, and F of a desiccant (e.g., 18), pass through a condenser (e.g., 80), and be exhausted to an outside environment. In these and similar embodiments, regeneration fluid may pass through a condenser (e.g., 80), flow through a recovery heat exchanger (e.g., 134), communicate with section C of a desiccant (e.g., 18), pass through a thermal unit (e.g., 54), communicate with section D of the desiccant, flow back through the recovery heat exchanger, and flow back through the condenser.

In some embodiments of the present systems (e.g., 10, 98, and/or the like), production rate of liquid water ($H_2O_{rate}$) may be expressed, at least in part, as a function of environmental conditions (e.g., ambient air temperature ($T_{amb}$), ambient air relative humidity ($RH_{amb}$), and solar insolation ($Q_{solar}$)) ell a s system operating parameters (e.g., control variables) (e.g., process air flow rate ($V_{process}$), regeneration fluid flow rate ($V_{regen}$), and exposure time of a desiccant to process air and regeneration fluid (e.g., which, for a desiccant disposed on a rotatable disk, may be a function of a rotation rate of the rotatable disk ($\omega_{disk}$)) (Eq. 1).

$$H_2O_{rate} = f(T_{amb}, RH_{amb}, Q_{solar}, \omega_{disk}, V_{process}, V_{regen}) \quad (1)$$

Efficiency of some embodiments of the present systems may be expressed in a variety of ways. The following examples are provided only by way of illustration, and each of the following examples may be used alone or in combination with other expressions (whether or not explicitly disclosed below) to describe an efficiency of some embodiments of the present systems. For example, efficiency may be defined as:

$$\eta = \Delta H_{vap,H_2O} \frac{m_{liquid\ H_2O,produced}}{Q_{total}} \quad (2)$$

where $\eta$ represents efficiency, $\Delta H_{vap,H_2O}$ represents the heat of vaporization of water, $m_{liquid\ H_2O,produced}$ represents a mass of liquid water produced, and $Q_{total}$ represents the heat energy required by the system to produce the mass of liquid water. From Eq. 2, it can be seen that an efficiency of 100% equates to 2260 joules (J) of heat energy required to produce 1 gram (g) of liquid water.

In some embodiments, efficiency may be defined as regeneration efficiency, or, for example:

$$\eta = \frac{m_{liquid\ H_2O, produced}}{m_{H_2O, recirculating}} \quad (3)$$

where $m_{H_2O, recirculating}$ represents a total mass of water present in the regeneration fluid pathway. As seen in Eq. 3, efficiency may generally improve as exit temperature of regeneration fluid from the condenser decreases.

In some embodiments, efficiency may be defined in terms of an effectiveness parameter (e.g., determined from psychrometric charts). Such an effectiveness parameter may be defined, for example, as the ratio of an actual amount of water adsorbed and/or desorbed by a desiccant to an idea isenthalpic path in the psychrometric chart. To illustrate, an effectiveness parameter may tend towards a value of unity (one), with higher gel carrying capacities, decreased disk rotation rates, lower disk heat capacity, and/or the like.

In some embodiments, efficiency may be defined as dehumidification effectiveness, or, for example:

$$\eta = \frac{m_{H_2O, in} - m_{H_2O, out}}{m_{H_2O, in}} \quad (4)$$

where $m_{H_2O, in}$ represents a total mass of water present in air entering process air pathway 26, and $m_{H_2O, out}$ represents a total mass of water leaving process air pathway 26.

Figure 5A:
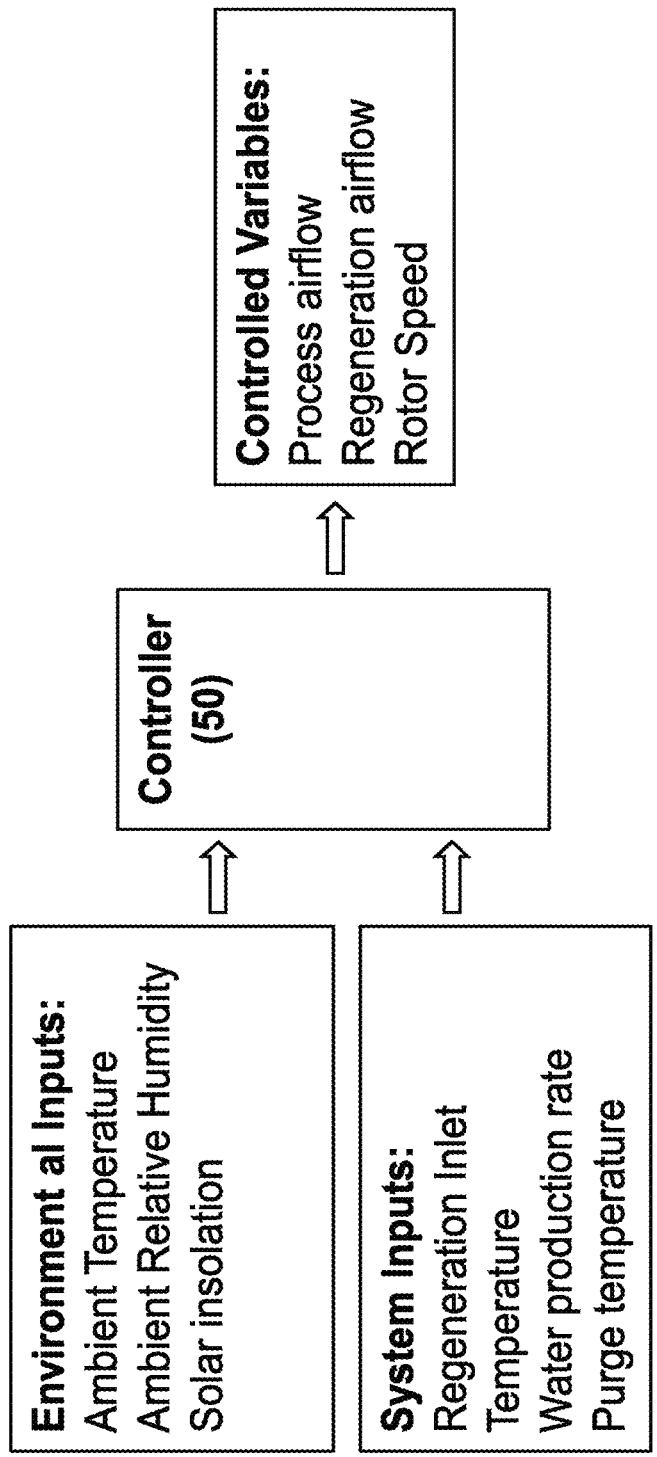
FIG. 5A is a diagram of a controller suitable for use in some embodiments of the present systems for generating liquid water from air, including exemplary environmental and system inputs and exemplary controlled variables.

As depicted in FIG. 5A, in some embodiments, a controller (e.g., 50) may control the system operating parameters, based on one or more of the environmental conditions (e.g., which may be measured by and/or indicated in data captured by one or more sensors 122) in order to optimize, for example, liquid water production. By way of illustration, in some embodiments, for each combination of particular environmental conditions corresponding to a given point in the diurnal cycle (e.g., 0° C.<$T_{amb}$<45° C.; 20%<$RH_{amb}$ 90%; 200 watts per square meter (W/m²)<$Q_{solar}$<1000 W/m²), the controller may perform a simulation using a model of a system (e.g., 10, 98, and/or the like) to estimate the optimal system operating parameters (e.g., $(\omega_{disk})_{optimum}$, $(V_{process})_{optimum}$, and $(V_{regen})_{optimum}$), that maximize and/or optimize liquid water production (e.g., as defined in Eq. 1), where:

$$(\omega_{disk})_{optimum} = f(T_{amb}, RH_{amb}, Q_{solar}) \quad (5)$$

$$(V_{process})_{optimum} = f(T_{amb}, RH_{amb}, Q_{solar}) \quad (6)$$

$$(V_{regen})_{optimum} = f(T_{amb}, RH_{amb}, Q_{solar}) \quad (7)$$

In some embodiments, a controller (e.g., 50) may employ a control algorithm that incorporates design variables (e.g. disk 102 geometry, such as, for example, thickness, radius, and/or the like, thermal unit 54 geometry, and/or the like), and, in some embodiments, these design variables may be incorporated in the control algorithm along with environmental conditions (e.g. ambient air temperature, ambient air relative humidity, solar insolation, and/or the like).

As described above, in some embodiments, ambient air temperature and ambient air relative humidity may be measured directly with one or more sensors (e.g., 122). In some embodiments, solar insolation may be measured indirectly (e.g., and continuously) by measuring a temperature of fluid in the regeneration fluid pathway between a thermal unit (e.g., 54) and a desiccant (e.g., 18) (e.g., at a known and controlled flow rate of regeneration fluid through the regeneration fluid pathway). In some embodiments, data captured by various sensor(s) may be transmitted to a controller (e.g., which may be in communication with a memory that stores a look-up table containing data generated during simulation runs) which then determines the optimum system operating parameters (e.g., process air flow rate, regeneration fluid flow rate, disk rotation rate, and/or the like).

In some embodiments, a numerical simulator may be used to create a look-up table of optimized operational parameters for the system. For example, in these embodiments, each run of the numerical simulator may take a single set of design specifications (e.g. disk kinetics, disk size, desiccant configuration, solar collector size, condenser geometry and performance, and/or the like), instantaneous and/or forecast ambient conditions (e.g. ambient air temperature, ambient air relative humidity, a level of solar insolation) and system operation variables (e.g., process air flow rate, regeneration fluid flow rate, desiccant exposure time to process air and/or regeneration fluid, and/or the like) to determine and/or estimate an optimized efficiency and/or liquid water production rate for the system (e.g., which optimized values may vary over a diurnal cycle).

Figure 5B:
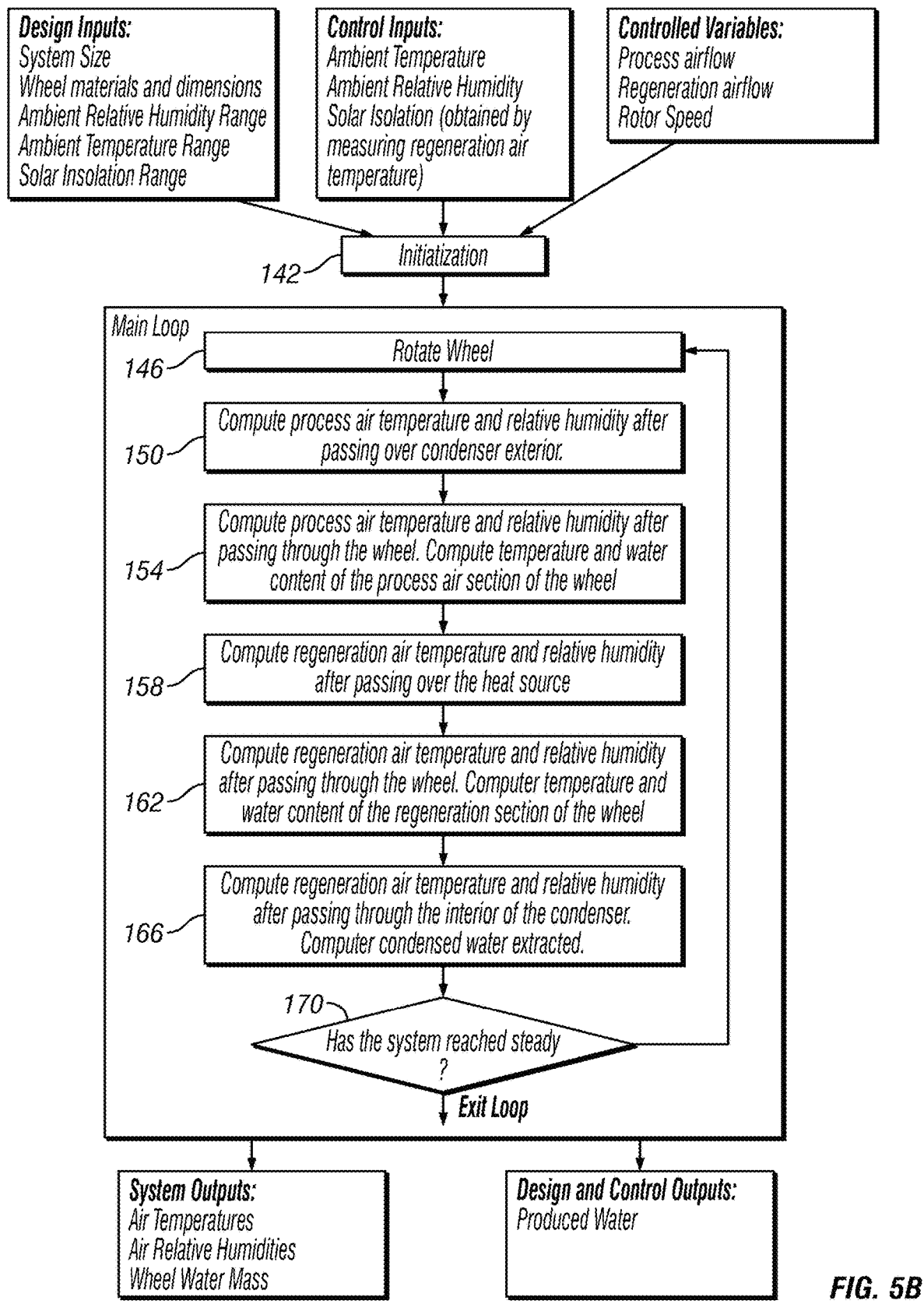
FIG. 5B is a diagram of an exemplary process, which can be performed by a controller of some embodiments of the present systems for generating liquid water from air, to achieve a steady state operation.

FIG. 5B is a flow chart of a non-limiting example of simulation-based control suitable for use in some embodiments of the present systems. As shown, the system may be initialized at step 142 with one or more design inputs, control inputs, and/or controller variables. In this embodiment, design inputs can include one or more of system size, disk materials and/or dimensions, desiccant materials and/or dimensions, control inputs can include ambient air relative humidity (e.g., or a range thereof), ambient air temperature (e.g., or a range thereof), and a level of solar insolation (e.g., or a range thereof), and controller variables can include process air flow rate, regeneration fluid flow rate, desiccant rate of movement, and/or the like. In some embodiments, one or more of the steps of this example may be performed by a controller (e.g., 50). In some embodiments, certain steps depicted in FIG. 5B may be omitted.

At step 146, movement of a desiccant (e.g., 18) can be simulated (e.g., by simulating rotation of disk 102 by a small amount, such as, for example, from 1-5°). In this embodiment, at step 150, simulated process air is passed over a simulated condenser (e.g., 80). In the depicted embodiment, also at step 150, process air temperature and process air relative humidity may be recalculated (e.g., using thermodynamic equations) after picking up thermal energy within the simulated condenser. At step 154, in this embodiment, process air fluid communication with the desiccant may be simulated, and process air temperature and process air relative humidity may be recalculated based on the simulated interaction with the desiccant.

At step 158, a simulation of regeneration fluid passing through a thermal unit (e.g., 54) can be performed, where regeneration fluid temperature and regeneration fluid relative humidity may be recalculated (e.g., again, using thermodynamic equations). In the depicted embodiment, at step 162, regeneration fluid fluid communication with the desiccant may be simulated, and the system may determine the regeneration fluid temperature and regeneration fluid relative humidity after the simulated interaction with the desiccant. In this embodiment, also at step 162, the system may determine the temperature and water content of the desiccant (or a portion thereof). At step 166, in the depicted embodiment, regeneration fluid passing through the condenser can be simulated, and the regeneration fluid temperature and the regeneration fluid relative humidity may be recalculated. In some embodiments, the amount of condensed water produced may also be calculated at step 166. At step 170, the systems of equations used to perform at least some of steps 146 through 166 can be evaluated to determine if a steady state solution has been reached. In this embodiment, if no steady state solution has been reached, the main loop may be repeated beginning at step 146.

Once a steady state solution is reached, in the embodiment shown, the controller (e.g., 50) may set the process air flow rate, the regeneration fluid flow rate, and the rate of movement of the desiccant (e.g., in a real system, for example, corresponding to the simulated system used to perform the steps of FIG. 5B) to optimize liquid water production and/or efficiency. The above steps are provided only by way of example, as, in some embodiments, the sequence of these steps may be changed. For example, in another embodiment, two separate process air pathways may exist such that in one of the process air pathways, process air passes through a condenser (e.g., 80) and in the other of the process air pathways, process air passes through a desiccant (e.g., 18), and the above steps may be modified accordingly.

In some embodiments, each run of the simulation depicted in FIG. 5B produces a single data point in the data look-up table (e.g., liquid water production rate and/or efficiency) as function of the design inputs, control inputs, and/or control variables. Such a numerical simulation may be repeated many times (e.g. from 100 to 100,000 times or more) to produce look-up table of liquid water production rates and/or efficiencies as function of the relevant variables. Such a table may then be used by a controller (e.g., 50) to operate a system (e.g., 10, 98, and/or the like), for example, by referencing optimal control variables (e.g., process air flow rate, regeneration fluid flow rate, desiccant movement rate, and/or the like) based upon known design inputs and/or measured control inputs (e.g., ambient air temperature, ambient air relative humidity, a level of solar insolation, and/or the like).

By way of example, Table 1, below, provides optimized operating conditions (e.g., control variables) versus design inputs and control inputs for an embodiment of the present systems that includes a disk (e.g., 102) having a silica desiccant disposed thereon.

TABLE 1

TABLE 1: Illustrative Optimal Operating Conditions and Design Specifications for an Embodiment of the Present Systems for Generating Liquid Water from Air

| Ambient Air % RH | Ambient Air Temp (C.) | Desiccant Rotation Rate (°/s) | Process Air Flow Rate (cfm) | Regeneration Fluid Flow Rate (cfm) | Heat (W) | Desiccant Thickness (m) | Disk Outer Radius (m) | Exhaust Process Air % RH | Liquid H$_2$O Production Rate (L/hr) | Efficiency |
|---|---|---|---|---|---|---|---|---|---|---|
| 20% | 10 | 0.6 | 90 | 4 | 300 | 0.05 | 0.12 | 9% | 0.114789 | 24% |
| 20% | 10 | 1 | 90 | 4 | 400 | 0.05 | 0.12 | 7% | 0.128647 | 20% |
| 20% | 10 | 1.4 | 90 | 4 | 500 | 0.05 | 0.12 | 6% | 0.126455 | 16% |
| 20% | 10 | 1 | 90 | 4 | 600 | 0.05 | 0.12 | 6% | 0.117378 | 12% |
| 20% | 10 | 1 | 90 | 4 | 700 | 0.05 | 0.12 | 6% | 0.117324 | 11% |
| 20% | 10 | 1 | 90 | 4 | 800 | 0.05 | 0.12 | 6% | 0.117304 | 9% |
| 20% | 15 | 0.6 | 90 | 4 | 300 | 0.05 | 0.12 | 10% | 0.116898 | 24% |
| 20% | 15 | 1 | 90 | 4 | 400 | 0.05 | 0.12 | 8% | 0.135425 | 21% |
| 20% | 15 | 1.4 | 90 | 5 | 500 | 0.05 | 0.12 | 7% | 0.13665 | 17% |
| 20% | 15 | 1.4 | 90 | 5 | 600 | 0.05 | 0.12 | 7% | 0.127931 | 13% |
| 20% | 15 | 1.4 | 90 | 4 | 700 | 0.05 | 0.12 | 7% | 0.123528 | 11% |
| 20% | 15 | 1.4 | 90 | 4 | 800 | 0.05 | 0.12 | 7% | 0.123402 | 10% |
| 20% | 20 | 0.6 | 90 | 4 | 300 | 0.05 | 0.12 | 11% | 0.114592 | 24% |
| 20% | 20 | 1 | 90 | 4 | 400 | 0.05 | 0.12 | 10% | 0.136252 | 21% |
| 20% | 20 | 1.4 | 90 | 4 | 500 | 0.05 | 0.12 | 9% | 0.140614 | 18% |
| 20% | 20 | 1.8 | 90 | 5 | 600 | 0.05 | 0.12 | 8% | 0.133403 | 14% |
| 20% | 20 | 1.4 | 90 | 4 | 700 | 0.05 | 0.12 | 8% | 0.125402 | 11% |
| 20% | 20 | 1.8 | 90 | 6 | 800 | 0.05 | 0.12 | 7% | 0.127496 | 10% |
| 20% | 25 | 1 | 90 | 4 | 300 | 0.05 | 0.12 | 12% | 0.117521 | 25% |
| 20% | 25 | 1 | 90 | 5 | 400 | 0.05 | 0.12 | 11% | 0.142599 | 22% |
| 20% | 25 | 1.4 | 90 | 4 | 500 | 0.05 | 0.12 | 9% | 0.155649 | 20% |
| 20% | 25 | 1.8 | 90 | 5 | 600 | 0.05 | 0.12 | 8% | 0.15298 | 16% |
| 20% | 25 | 1.4 | 90 | 5 | 700 | 0.05 | 0.12 | 9% | 0.151051 | 14% |
| 20% | 25 | 1.4 | 90 | 4 | 800 | 0.05 | 0.12 | 9% | 0.137663 | 11% |
| 20% | 30 | 1 | 90 | 4 | 300 | 0.05 | 0.12 | 13% | 0.120365 | 25% |
| 20% | 30 | 1.4 | 90 | 5 | 400 | 0.05 | 0.12 | 11% | 0.144586 | 23% |
| 20% | 30 | 1.4 | 90 | 4 | 500 | 0.05 | 0.12 | 10% | 0.158795 | 20% |
| 20% | 30 | 1.4 | 90 | 4 | 600 | 0.05 | 0.12 | 10% | 0.166699 | 17% |
| 20% | 30 | 1.8 | 90 | 5 | 700 | 0.05 | 0.12 | 9% | 0.164122 | 15% |
| 20% | 30 | 2.6 | 90 | 6 | 800 | 0.05 | 0.12 | 8% | 0.148756 | 12% |
| 20% | 35 | 1 | 90 | 4 | 300 | 0.05 | 0.12 | 13% | 0.117452 | 25% |
| 20% | 35 | 1.4 | 90 | 4 | 400 | 0.05 | 0.12 | 12% | 0.139812 | 22% |
| 20% | 35 | 1.4 | 90 | 4 | 500 | 0.05 | 0.12 | 11% | 0.147449 | 19% |
| 20% | 35 | 1.4 | 90 | 4 | 600 | 0.05 | 0.12 | 11% | 0.152162 | 16% |
| 20% | 35 | 1.4 | 90 | 4 | 700 | 0.05 | 0.12 | 11% | 0.155368 | 14% |
| 20% | 35 | 1.4 | 90 | 4 | 800 | 0.05 | 0.12 | 11% | 0.157911 | 12% |
| 30% | 10 | 0.6 | 90 | 4 | 300 | 0.05 | 0.12 | 14% | 0.129974 | 27% |
| 30% | 10 | 1 | 90 | 4 | 400 | 0.05 | 0.12 | 11% | 0.15635 | 25% |
| 30% | 10 | 1 | 90 | 5 | 500 | 0.05 | 0.12 | 9% | 0.169455 | 21% |
| 30% | 10 | 1.4 | 90 | 5 | 600 | 0.05 | 0.12 | 8% | 0.171671 | 18% |
| 30% | 10 | 1.4 | 90 | 5 | 700 | 0.05 | 0.12 | 8% | 0.169347 | 15% |
| 30% | 10 | 1.4 | 90 | 5 | 800 | 0.05 | 0.12 | 8% | 0.169209 | 13% |
| 30% | 15 | 0.6 | 90 | 4 | 300 | 0.05 | 0.12 | 16% | 0.135576 | 28% |
| 30% | 15 | 1 | 90 | 4 | 400 | 0.05 | 0.12 | 13% | 0.164791 | 26% |

TABLE 1-continued

TABLE 1: Illustrative Optimal Operating Conditions and Design Specifications
for an Embodiment of the Present Systems for Generating Liquid Water from Air

| Ambient Air % RH | Ambient Air Temp (C.) | Desiccant Rotation Rate (°/s) | Process Air Flow Rate (cfm) | Regeneration Fluid Flow Rate (cfm) | Heat (W) | Desiccant Thickness (m) | Disk Outer Radius (m) | Exhaust Process Air % RH | Liquid $H_2O$ Production Rate (L/hr) | Efficiency |
|---|---|---|---|---|---|---|---|---|---|---|
| 30% | 15 | 1.4 | 90 | 5 | 500 | 0.05 | 0.12 | 11% | 0.177866 | 22% |
| 30% | 15 | 1.4 | 90 | 5 | 600 | 0.05 | 0.12 | 10% | 0.181001 | 19% |
| 30% | 15 | 1.4 | 90 | 5 | 700 | 0.05 | 0.12 | 10% | 0.178858 | 16% |
| 30% | 15 | 1.4 | 90 | 5 | 800 | 0.05 | 0.12 | 10% | 0.178663 | 14% |
| 30% | 20 | 0.6 | 90 | 4 | 300 | 0.05 | 0.12 | 17% | 0.138859 | 29% |
| 30% | 20 | 1 | 90 | 4 | 400 | 0.05 | 0.12 | 14% | 0.170558 | 27% |
| 30% | 20 | 1.4 | 90 | 5 | 500 | 0.05 | 0.12 | 13% | 0.186046 | 23% |
| 30% | 20 | 1.8 | 90 | 6 | 600 | 0.05 | 0.12 | 11% | 0.190955 | 20% |
| 30% | 20 | 1.8 | 90 | 6 | 700 | 0.05 | 0.12 | 10% | 0.190329 | 17% |
| 30% | 20 | 1.8 | 90 | 6 | 800 | 0.05 | 0.12 | 10% | 0.191953 | 15% |
| 30% | 25 | 0.6 | 90 | 4 | 300 | 0.05 | 0.12 | 18% | 0.142598 | 30% |
| 30% | 25 | 1 | 90 | 4 | 400 | 0.05 | 0.12 | 16% | 0.181979 | 29% |
| 30% | 25 | 1.4 | 90 | 5 | 500 | 0.05 | 0.12 | 14% | 0.205825 | 26% |
| 30% | 25 | 1.8 | 90 | 6 | 600 | 0.05 | 0.12 | 12% | 0.217698 | 23% |
| 30% | 25 | 1.8 | 90 | 6 | 700 | 0.05 | 0.12 | 11% | 0.217838 | 20% |
| 30% | 25 | 2.2 | 90 | 6 | 800 | 0.05 | 0.12 | 11% | 0.216324 | 17% |
| 30% | 30 | 0.6 | 90 | 4 | 300 | 0.05 | 0.12 | 19% | 0.143171 | 30% |
| 30% | 30 | 1 | 90 | 4 | 400 | 0.05 | 0.12 | 17% | 0.188855 | 30% |
| 30% | 30 | 1.4 | 90 | 5 | 500 | 0.05 | 0.12 | 15% | 0.215839 | 27% |
| 30% | 30 | 1.8 | 90 | 6 | 600 | 0.05 | 0.12 | 13% | 0.228551 | 24% |
| 30% | 30 | 2.2 | 90 | 6 | 700 | 0.05 | 0.12 | 12% | 0.229472 | 21% |
| 30% | 30 | 2.2 | 90 | 6 | 800 | 0.05 | 0.12 | 12% | 0.227413 | 18% |
| 30% | 35 | 0.6 | 90 | 5 | 300 | 0.05 | 0.12 | 21% | 0.157775 | 33% |
| 30% | 35 | 1 | 90 | 4 | 400 | 0.05 | 0.12 | 18% | 0.190279 | 30% |
| 30% | 35 | 1.4 | 90 | 5 | 500 | 0.05 | 0.12 | 16% | 0.216748 | 27% |
| 30% | 35 | 1.8 | 90 | 6 | 600 | 0.05 | 0.12 | 14% | 0.256955 | 27% |
| 30% | 35 | 2.2 | 90 | 6 | 700 | 0.05 | 0.12 | 13% | 0.259982 | 23% |
| 30% | 35 | 2.6 | 90 | 7 | 800 | 0.05 | 0.12 | 12% | 0.235721 | 18% |
| 40% | 10 | 0.6 | 90 | 4 | 300 | 0.05 | 0.12 | 19% | 0.147654 | 31% |
| 40% | 10 | 0.6 | 90 | 4 | 400 | 0.05 | 0.12 | 16% | 0.182417 | 29% |
| 40% | 10 | 1 | 90 | 4 | 500 | 0.05 | 0.12 | 13% | 0.209919 | 26% |
| 40% | 10 | 1.4 | 90 | 5 | 600 | 0.05 | 0.12 | 11% | 0.218139 | 23% |
| 40% | 10 | 1.4 | 90 | 5 | 700 | 0.05 | 0.12 | 11% | 0.218186 | 20% |
| 40% | 10 | 1.4 | 90 | 5 | 800 | 0.05 | 0.12 | 11% | 0.217967 | 17% |
| 40% | 15 | 0.6 | 90 | 4 | 300 | 0.05 | 0.12 | 21% | 0.154558 | 32% |
| 40% | 15 | 1 | 90 | 4 | 400 | 0.05 | 0.12 | 18% | 0.189338 | 30% |
| 40% | 15 | 1 | 90 | 4 | 500 | 0.05 | 0.12 | 15% | 0.219899 | 28% |
| 40% | 15 | 1.4 | 90 | 5 | 600 | 0.05 | 0.12 | 13% | 0.230924 | 24% |
| 40% | 15 | 1.4 | 90 | 5 | 700 | 0.05 | 0.12 | 13% | 0.230829 | 21% |
| 40% | 15 | 1.4 | 90 | 5 | 800 | 0.05 | 0.12 | 13% | 0.230595 | 18% |
| 40% | 20 | 0.6 | 90 | 4 | 300 | 0.05 | 0.12 | 23% | 0.159779 | 33% |
| 40% | 20 | 1 | 90 | 4 | 400 | 0.05 | 0.12 | 20% | 0.197003 | 31% |
| 40% | 20 | 1 | 90 | 5 | 500 | 0.05 | 0.12 | 17% | 0.228599 | 29% |
| 40% | 20 | 1.4 | 90 | 6 | 600 | 0.05 | 0.12 | 15% | 0.247023 | 26% |
| 40% | 20 | 1.8 | 90 | 7 | 700 | 0.05 | 0.12 | 13% | 0.254703 | 23% |
| 40% | 20 | 1.8 | 90 | 6 | 800 | 0.05 | 0.12 | 13% | 0.254027 | 20% |
| 40% | 25 | 0.6 | 90 | 4 | 300 | 0.05 | 0.12 | 25% | 0.165997 | 35% |
| 40% | 25 | 1 | 90 | 4 | 400 | 0.05 | 0.12 | 21% | 0.209369 | 33% |
| 40% | 25 | 1 | 90 | 5 | 500 | 0.05 | 0.12 | 18% | 0.247311 | 31% |
| 40% | 25 | 1.4 | 90 | 6 | 600 | 0.05 | 0.12 | 16% | 0.275485 | 29% |
| 40% | 25 | 1.8 | 90 | 6 | 700 | 0.05 | 0.12 | 14% | 0.289535 | 26% |
| 40% | 25 | 2.2 | 90 | 7 | 800 | 0.05 | 0.12 | 13% | 0.290837 | 23% |
| 40% | 30 | 0.6 | 90 | 4 | 300 | 0.05 | 0.12 | 26% | 0.170385 | 36% |
| 40% | 30 | 1 | 90 | 4 | 400 | 0.05 | 0.12 | 22% | 0.218117 | 34% |
| 40% | 30 | 1.4 | 90 | 5 | 500 | 0.05 | 0.12 | 20% | 0.255419 | 32% |
| 40% | 30 | 1.4 | 90 | 6 | 600 | 0.05 | 0.12 | 18% | 0.288 | 30% |
| 40% | 30 | 1.8 | 90 | 6 | 700 | 0.05 | 0.12 | 16% | 0.305618 | 27% |
| 40% | 30 | 2.2 | 90 | 7 | 800 | 0.05 | 0.12 | 14% | 0.306437 | 24% |
| 40% | 35 | 0.6 | 90 | 4 | 300 | 0.05 | 0.12 | 27% | 0.170405 | 36% |
| 40% | 35 | 1 | 90 | 4 | 400 | 0.05 | 0.12 | 24% | 0.221043 | 35% |
| 40% | 35 | 1.4 | 90 | 5 | 500 | 0.05 | 0.12 | 21% | 0.260556 | 33% |
| 40% | 35 | 1.8 | 90 | 6 | 600 | 0.05 | 0.12 | 19% | 0.289696 | 30% |
| 40% | 35 | 1.8 | 90 | 6 | 700 | 0.05 | 0.12 | 17% | 0.307534 | 28% |
| 40% | 35 | 2.6 | 90 | 7 | 800 | 0.05 | 0.12 | 15% | 0.30755 | 24% |
| 50% | 10 | 0.6 | 90 | 4 | 300 | 0.05 | 0.12 | 25% | 0.161131 | 34% |
| 50% | 10 | 0.6 | 90 | 4 | 400 | 0.05 | 0.12 | 20% | 0.209095 | 33% |
| 50% | 10 | 1 | 90 | 4 | 500 | 0.05 | 0.12 | 16% | 0.238543 | 30% |
| 50% | 10 | 1.4 | 90 | 5 | 600 | 0.05 | 0.12 | 14% | 0.253661 | 27% |
| 50% | 10 | 1.4 | 90 | 6 | 700 | 0.05 | 0.12 | 12% | 0.260525 | 23% |
| 50% | 10 | 1.8 | 90 | 6 | 800 | 0.05 | 0.12 | 12% | 0.258666 | 20% |
| 50% | 15 | 0.6 | 90 | 4 | 300 | 0.05 | 0.12 | 28% | 0.168604 | 35% |
| 50% | 15 | 0.6 | 90 | 4 | 400 | 0.05 | 0.12 | 23% | 0.215671 | 34% |

TABLE 1-continued

TABLE 1: Illustrative Optimal Operating Conditions and Design Specifications
for an Embodiment of the Present Systems for Generating Liquid Water from Air

| Ambient Air % RH | Ambient Air Temp (C.) | Desiccant Rotation Rate (°/s) | Process Air Flow Rate (cfm) | Regeneration Fluid Flow Rate (cfm) | Heat (W) | Desiccant Thickness (m) | Disk Outer Radius (m) | Exhaust Process Air % RH | Liquid H$_2$O Production Rate (L/hr) | Efficiency |
|---|---|---|---|---|---|---|---|---|---|---|
| 50% | 15 | 1 | 90 | 4 | 500 | 0.05 | 0.12 | 19% | 0.249856 | 31% |
| 50% | 15 | 1.4 | 90 | 5 | 600 | 0.05 | 0.12 | 17% | 0.268291 | 28% |
| 50% | 15 | 1.4 | 90 | 6 | 700 | 0.05 | 0.12 | 15% | 0.276009 | 25% |
| 50% | 15 | 1.8 | 90 | 6 | 800 | 0.05 | 0.12 | 14% | 0.276355 | 22% |
| 50% | 20 | 0.6 | 90 | 4 | 300 | 0.05 | 0.12 | 30% | 0.174707 | 37% |
| 50% | 20 | 0.6 | 90 | 4 | 400 | 0.05 | 0.12 | 25% | 0.219977 | 35% |
| 50% | 20 | 1 | 90 | 5 | 500 | 0.05 | 0.12 | 22% | 0.261604 | 33% |
| 50% | 20 | 1.4 | 90 | 6 | 600 | 0.05 | 0.12 | 19% | 0.287784 | 30% |
| 50% | 20 | 1.8 | 90 | 7 | 700 | 0.05 | 0.12 | 17% | 0.305206 | 27% |
| 50% | 20 | 1.8 | 90 | 7 | 800 | 0.05 | 0.12 | 15% | 0.314038 | 25% |
| 50% | 25 | 0.6 | 90 | 4 | 300 | 0.05 | 0.12 | 31% | 0.182108 | 38% |
| 50% | 25 | 1 | 90 | 4 | 400 | 0.05 | 0.12 | 27% | 0.229061 | 36% |
| 50% | 25 | 1 | 90 | 5 | 500 | 0.05 | 0.12 | 23% | 0.280957 | 35% |
| 50% | 25 | 1.4 | 90 | 6 | 600 | 0.05 | 0.12 | 20% | 0.31591 | 33% |
| 50% | 25 | 1.8 | 90 | 7 | 700 | 0.05 | 0.12 | 18% | 0.340444 | 31% |
| 50% | 25 | 1.8 | 90 | 7 | 800 | 0.05 | 0.12 | 16% | 0.355011 | 28% |
| 50% | 30 | 0.6 | 90 | 4 | 300 | 0.05 | 0.12 | 33% | 0.188614 | 39% |
| 50% | 30 | 1 | 90 | 5 | 400 | 0.05 | 0.12 | 29% | 0.23885 | 37% |
| 50% | 30 | 1 | 90 | 5 | 500 | 0.05 | 0.12 | 25% | 0.292067 | 37% |
| 50% | 30 | 1.4 | 90 | 6 | 600 | 0.05 | 0.12 | 22% | 0.331455 | 35% |
| 50% | 30 | 1.8 | 90 | 7 | 700 | 0.05 | 0.12 | 20% | 0.359095 | 32% |
| 50% | 30 | 2.2 | 90 | 7 | 800 | 0.05 | 0.12 | 18% | 0.375297 | 29% |
| 50% | 35 | 0.6 | 90 | 4 | 300 | 0.05 | 0.12 | 34% | 0.192377 | 40% |
| 50% | 35 | 1 | 90 | 5 | 400 | 0.05 | 0.12 | 30% | 0.244036 | 38% |
| 50% | 35 | 1 | 90 | 5 | 500 | 0.05 | 0.12 | 27% | 0.295248 | 37% |
| 50% | 35 | 1.4 | 90 | 6 | 600 | 0.05 | 0.12 | 24% | 0.338213 | 35% |
| 50% | 35 | 1.8 | 90 | 7 | 700 | 0.05 | 0.12 | 21% | 0.367278 | 33% |
| 50% | 35 | 2.2 | 90 | 7 | 800 | 0.05 | 0.12 | 19% | 0.384249 | 30% |
| 60% | 10 | 0.6 | 90 | 5 | 300 | 0.05 | 0.12 | 31% | 0.167431 | 35% |
| 60% | 10 | 0.6 | 90 | 4 | 400 | 0.05 | 0.12 | 25% | 0.227607 | 36% |
| 60% | 10 | 1 | 90 | 4 | 500 | 0.05 | 0.12 | 21% | 0.259032 | 33% |
| 60% | 10 | 1 | 90 | 5 | 600 | 0.05 | 0.12 | 17% | 0.286405 | 30% |
| 60% | 10 | 1.4 | 90 | 6 | 700 | 0.05 | 0.12 | 15% | 0.298812 | 27% |
| 60% | 10 | 1.8 | 90 | 7 | 800 | 0.05 | 0.12 | 14% | 0.298656 | 23% |
| 60% | 15 | 0.6 | 90 | 5 | 300 | 0.05 | 0.12 | 34% | 0.17599 | 37% |
| 60% | 15 | 0.6 | 90 | 4 | 400 | 0.05 | 0.12 | 28% | 0.235977 | 37% |
| 60% | 15 | 1 | 90 | 5 | 500 | 0.05 | 0.12 | 24% | 0.271262 | 34% |
| 60% | 15 | 1 | 90 | 5 | 600 | 0.05 | 0.12 | 20% | 0.300276 | 31% |
| 60% | 15 | 1.4 | 90 | 6 | 700 | 0.05 | 0.12 | 18% | 0.317478 | 28% |
| 60% | 15 | 1.8 | 90 | 7 | 800 | 0.05 | 0.12 | 16% | 0.321377 | 25% |
| 60% | 20 | 0.6 | 90 | 4 | 300 | 0.05 | 0.12 | 36% | 0.186651 | 39% |
| 60% | 20 | 0.6 | 90 | 4 | 400 | 0.05 | 0.12 | 30% | 0.243141 | 38% |
| 60% | 20 | 1 | 90 | 5 | 500 | 0.05 | 0.12 | 26% | 0.284712 | 36% |
| 60% | 20 | 1 | 90 | 5 | 600 | 0.05 | 0.12 | 23% | 0.317663 | 33% |
| 60% | 20 | 1.4 | 90 | 7 | 700 | 0.05 | 0.12 | 20% | 0.347911 | 31% |
| 60% | 20 | 1.8 | 90 | 8 | 800 | 0.05 | 0.12 | 18% | 0.365139 | 29% |
| 60% | 25 | 0.6 | 90 | 4 | 300 | 0.05 | 0.12 | 38% | 0.194972 | 41% |
| 60% | 25 | 0.6 | 90 | 4 | 400 | 0.05 | 0.12 | 33% | 0.252843 | 40% |
| 60% | 25 | 1 | 90 | 5 | 500 | 0.05 | 0.12 | 28% | 0.304025 | 38% |
| 60% | 25 | 1 | 90 | 5 | 600 | 0.05 | 0.12 | 25% | 0.344425 | 36% |
| 60% | 25 | 1.4 | 90 | 6 | 700 | 0.05 | 0.12 | 22% | 0.383939 | 34% |
| 60% | 25 | 1.8 | 90 | 7 | 800 | 0.05 | 0.12 | 19% | 0.408065 | 32% |
| 60% | 30 | 0.6 | 90 | 4 | 300 | 0.05 | 0.12 | 39% | 0.203487 | 43% |
| 60% | 30 | 0.6 | 90 | 4 | 400 | 0.05 | 0.12 | 34% | 0.259767 | 41% |
| 60% | 30 | 1 | 90 | 5 | 500 | 0.05 | 0.12 | 30% | 0.31643 | 40% |
| 60% | 30 | 1.4 | 90 | 6 | 600 | 0.05 | 0.12 | 27% | 0.361017 | 38% |
| 60% | 30 | 1.4 | 90 | 6 | 700 | 0.05 | 0.12 | 24% | 0.402837 | 36% |
| 60% | 30 | 1.8 | 90 | 7 | 800 | 0.05 | 0.12 | 21% | 0.430806 | 34% |
| 60% | 35 | 0.6 | 90 | 4 | 300 | 0.05 | 0.12 | 41% | 0.210929 | 44% |
| 60% | 35 | 1 | 90 | 5 | 400 | 0.05 | 0.12 | 36% | 0.26243 | 41% |
| 60% | 35 | 1 | 90 | 6 | 500 | 0.05 | 0.12 | 32% | 0.322488 | 40% |
| 60% | 35 | 1.4 | 90 | 6 | 600 | 0.05 | 0.12 | 29% | 0.370266 | 39% |
| 60% | 35 | 1.4 | 90 | 6 | 700 | 0.05 | 0.12 | 26% | 0.410392 | 37% |
| 60% | 35 | 1.8 | 90 | 7 | 800 | 0.05 | 0.12 | 23% | 0.44132 | 35% |
| 70% | 10 | 0.6 | 90 | 5 | 300 | 0.05 | 0.12 | 37% | 0.17757 | 37% |
| 70% | 10 | 0.6 | 90 | 5 | 400 | 0.05 | 0.12 | 30% | 0.237589 | 37% |
| 70% | 10 | 1 | 90 | 4 | 500 | 0.05 | 0.12 | 25% | 0.275147 | 35% |
| 70% | 10 | 1 | 90 | 5 | 600 | 0.05 | 0.12 | 21% | 0.313577 | 33% |
| 70% | 10 | 1.4 | 90 | 6 | 700 | 0.05 | 0.12 | 18% | 0.330161 | 30% |
| 70% | 10 | 1.8 | 90 | 7 | 800 | 0.05 | 0.12 | 16% | 0.335088 | 26% |
| 70% | 15 | 0.6 | 90 | 5 | 300 | 0.05 | 0.12 | 40% | 0.186547 | 39% |
| 70% | 15 | 0.6 | 90 | 6 | 400 | 0.05 | 0.12 | 34% | 0.243351 | 38% |

TABLE 1-continued

TABLE 1: Illustrative Optimal Operating Conditions and Design Specifications
for an Embodiment of the Present Systems for Generating Liquid Water from Air

| Ambient Air % RH | Ambient Air Temp (C.) | Desiccant Rotation Rate (°/s) | Process Air Flow Rate (cfm) | Regeneration Fluid Flow Rate (cfm) | Heat (W) | Desiccant Thickness (m) | Disk Outer Radius (m) | Exhaust Process Air % RH | Liquid H$_2$O Production Rate (L/hr) | Efficiency |
|---|---|---|---|---|---|---|---|---|---|---|
| 70% | 15 | 1   | 90 | 5 | 500 | 0.05 | 0.12 | 28% | 0.28831  | 36% |
| 70% | 15 | 1   | 90 | 5 | 600 | 0.05 | 0.12 | 24% | 0.328954 | 34% |
| 70% | 15 | 1.4 | 90 | 6 | 700 | 0.05 | 0.12 | 21% | 0.350796 | 31% |
| 70% | 15 | 1.8 | 90 | 7 | 800 | 0.05 | 0.12 | 19% | 0.361302 | 28% |
| 70% | 20 | 0.6 | 90 | 4 | 400 | 0.05 | 0.12 | 36% | 0.259806 | 41% |
| 70% | 20 | 1   | 90 | 5 | 500 | 0.05 | 0.12 | 31% | 0.302529 | 38% |
| 70% | 20 | 1   | 90 | 6 | 600 | 0.05 | 0.12 | 27% | 0.347849 | 36% |
| 70% | 20 | 1.4 | 90 | 7 | 700 | 0.05 | 0.12 | 24% | 0.382106 | 34% |
| 70% | 20 | 1.8 | 90 | 8 | 800 | 0.05 | 0.12 | 21% | 0.405931 | 32% |
| 70% | 25 | 0.6 | 90 | 5 | 300 | 0.05 | 0.12 | 45% | 0.203098 | 43% |
| 70% | 25 | 0.6 | 90 | 4 | 400 | 0.05 | 0.12 | 38% | 0.272149 | 43% |
| 70% | 25 | 1   | 90 | 6 | 500 | 0.05 | 0.12 | 34% | 0.322165 | 40% |
| 70% | 25 | 1   | 90 | 6 | 600 | 0.05 | 0.12 | 29% | 0.374567 | 39% |
| 70% | 25 | 1.4 | 90 | 7 | 700 | 0.05 | 0.12 | 26% | 0.416746 | 37% |
| 70% | 25 | 1.8 | 90 | 8 | 800 | 0.05 | 0.12 | 23% | 0.447221 | 35% |
| 70% | 30 | 0.6 | 90 | 5 | 300 | 0.05 | 0.12 | 46% | 0.210718 | 44% |
| 70% | 30 | 0.6 | 90 | 4 | 400 | 0.05 | 0.12 | 40% | 0.283104 | 44% |
| 70% | 30 | 1   | 90 | 6 | 500 | 0.05 | 0.12 | 36% | 0.335956 | 42% |
| 70% | 30 | 1   | 90 | 6 | 600 | 0.05 | 0.12 | 32% | 0.389423 | 41% |
| 70% | 30 | 1.4 | 90 | 7 | 700 | 0.05 | 0.12 | 28% | 0.436659 | 39% |
| 70% | 30 | 1.8 | 90 | 8 | 800 | 0.05 | 0.12 | 25% | 0.470857 | 37% |
| 70% | 35 | 0.6 | 90 | 5 | 300 | 0.05 | 0.12 | 48% | 0.214885 | 45% |
| 70% | 35 | 0.6 | 90 | 4 | 400 | 0.05 | 0.12 | 42% | 0.28812  | 45% |
| 70% | 35 | 1   | 90 | 6 | 500 | 0.05 | 0.12 | 38% | 0.343864 | 43% |
| 70% | 35 | 1   | 90 | 6 | 600 | 0.05 | 0.12 | 34% | 0.395523 | 41% |
| 70% | 35 | 1.4 | 90 | 7 | 700 | 0.05 | 0.12 | 30% | 0.447679 | 40% |
| 70% | 35 | 1.8 | 90 | 8 | 800 | 0.05 | 0.12 | 27% | 0.484405 | 38% |

To illustrate how a controller (e.g., 50) may rely on a look-up table to operate a system (e.g., 10, 98, and/or the like) a series of graphs is provided with environmental conditions as independent variables, and efficiency or liquid water production rate and system operating parameters as the dependent variables (e.g., and values illustrated in the below graphs may be contained in a look-up table for reference by a controller).

Figure 6:
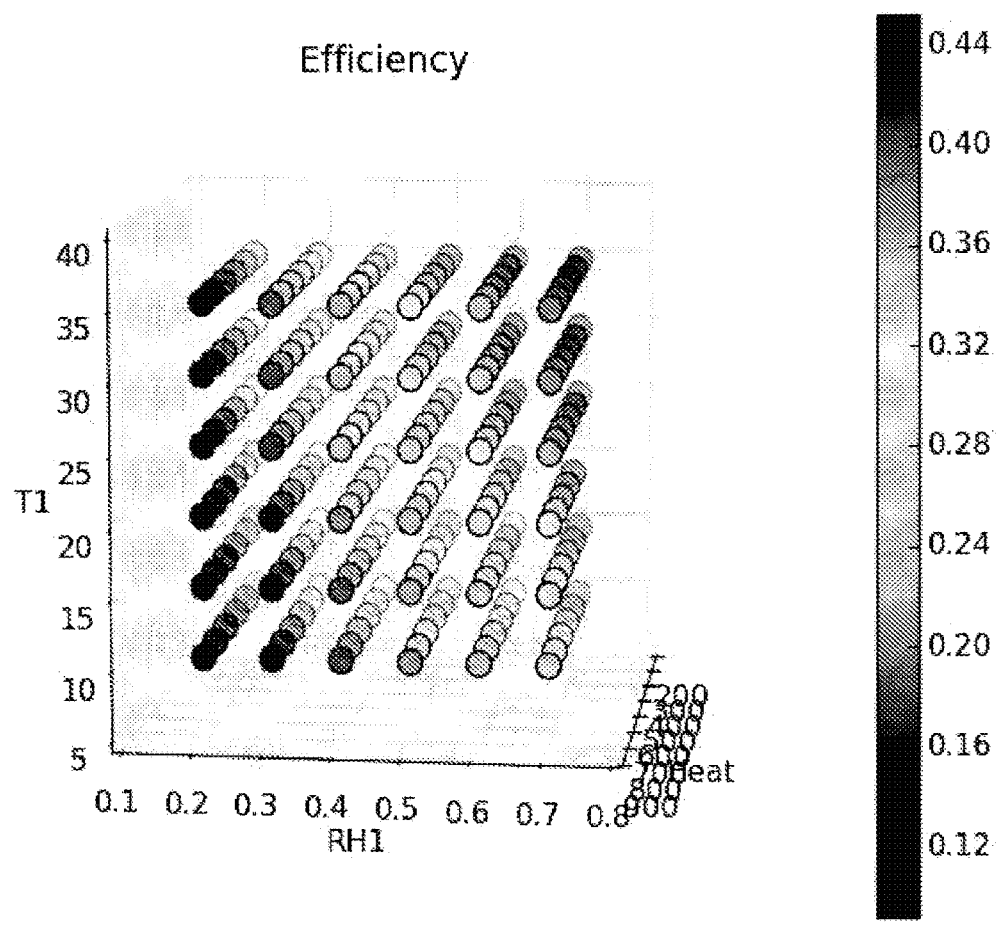
FIG. 6 is a graph illustrating an efficiency of some embodiments of the present systems for generating liquid air from water, at a constant process airflow rate of 90 cubic feet per minute (cfm), versus ambient air temperature in degrees Celsius (° C.) ("T1"), ambient air relative humidity ("RH1"), and solar insolation as indicated by heat in watts (W) provided by a thermal unit, such that each point on the graph may represent a system efficiency at a point in a diurnal cycle.

For example, FIG. 6 is a graph illustrating an efficiency of some embodiments of the present systems for generating liquid air from water, at a constant process airflow rate of 90 (cfm), versus ambient air temperature (° C.) ("T1"), ambient air relative humidity ("RH1"), and solar insolation as indicated by heat (W) provided by a thermal unit, such that each point on the graph may represent a system efficiency at a point in a diurnal cycle.

Figure 7:
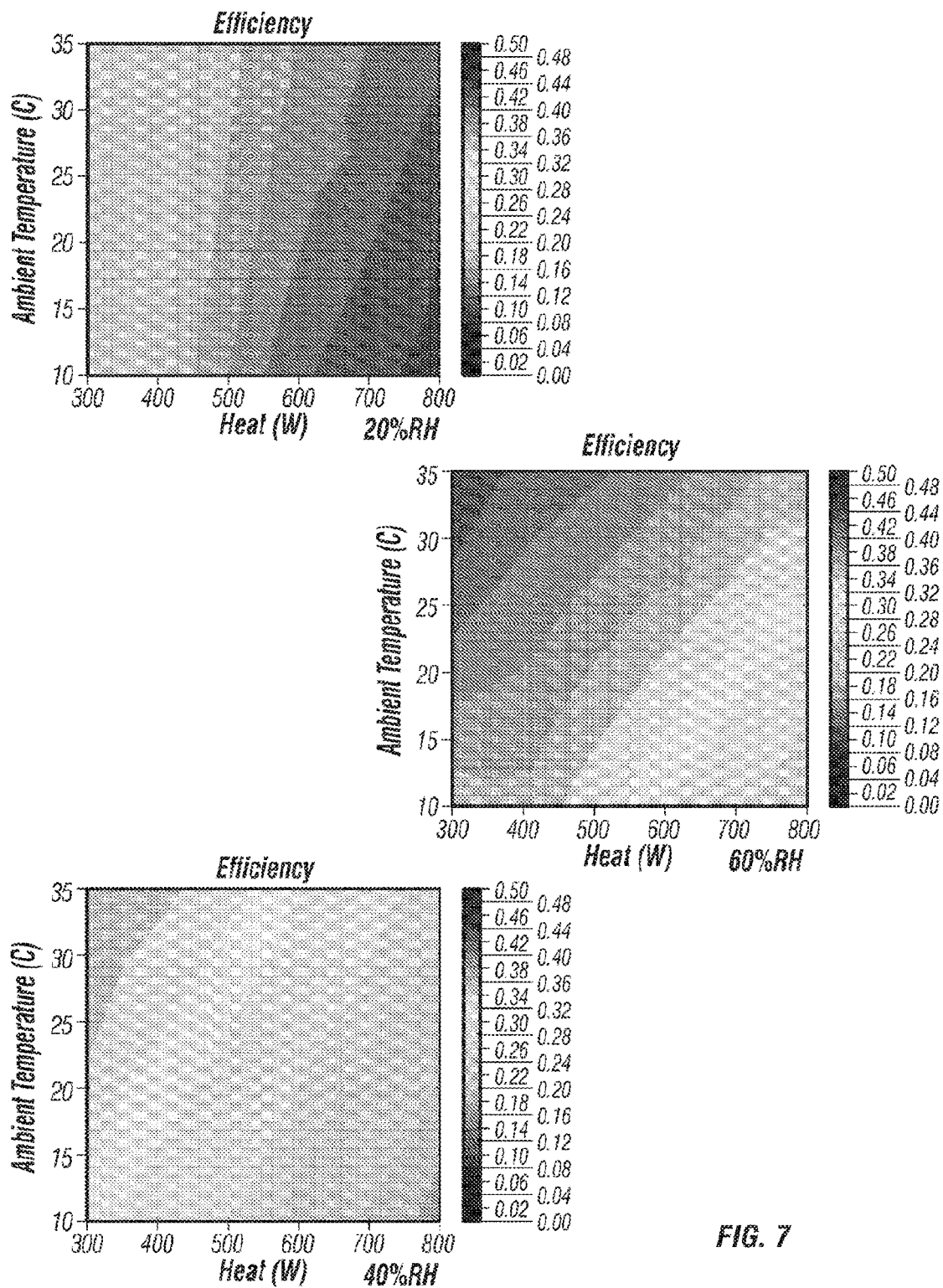
FIG. 7 is a series graphs illustrating an efficiency of some embodiments of the present systems for generating liquid air from water (e.g., highest efficiency represented as darkest gray), at constant ambient air relative humidities ("RH"), at a constant process airflow rate of 90 cfm, versus environmental diurnal variations, including ambient air temperature (° C.) and solar insolation as indicated by heat (W) provided by a thermal unit, such that each point on each graph may represent a system efficiency at a point in a diurnal cycle.
Figure 7:
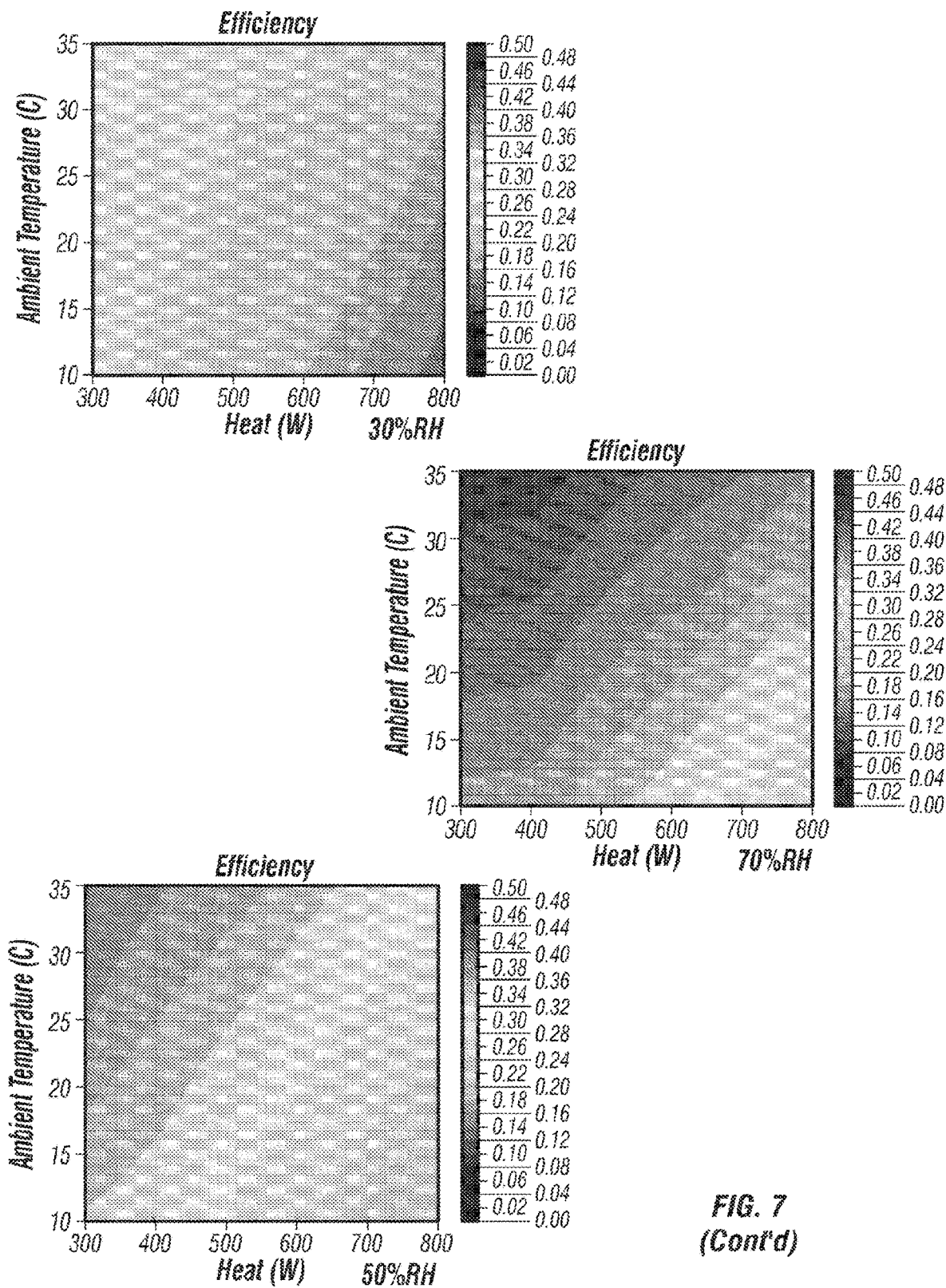

FIG. 7 is a series of graphs illustrating an efficiency of some embodiments of the present systems for generating liquid air from water (e.g., highest efficiency represented as darkest gray), at constant ambient air relative humidities ("RH"), at a constant process airflow rate of 90 cfm, versus environmental diurnal variations, including ambient air temperature (° C.) and solar insolation as indicated by heat (W) provided by a thermal unit, such that each point on each graph may represent a system efficiency at a point in a diurnal cycle.

Figure 8:
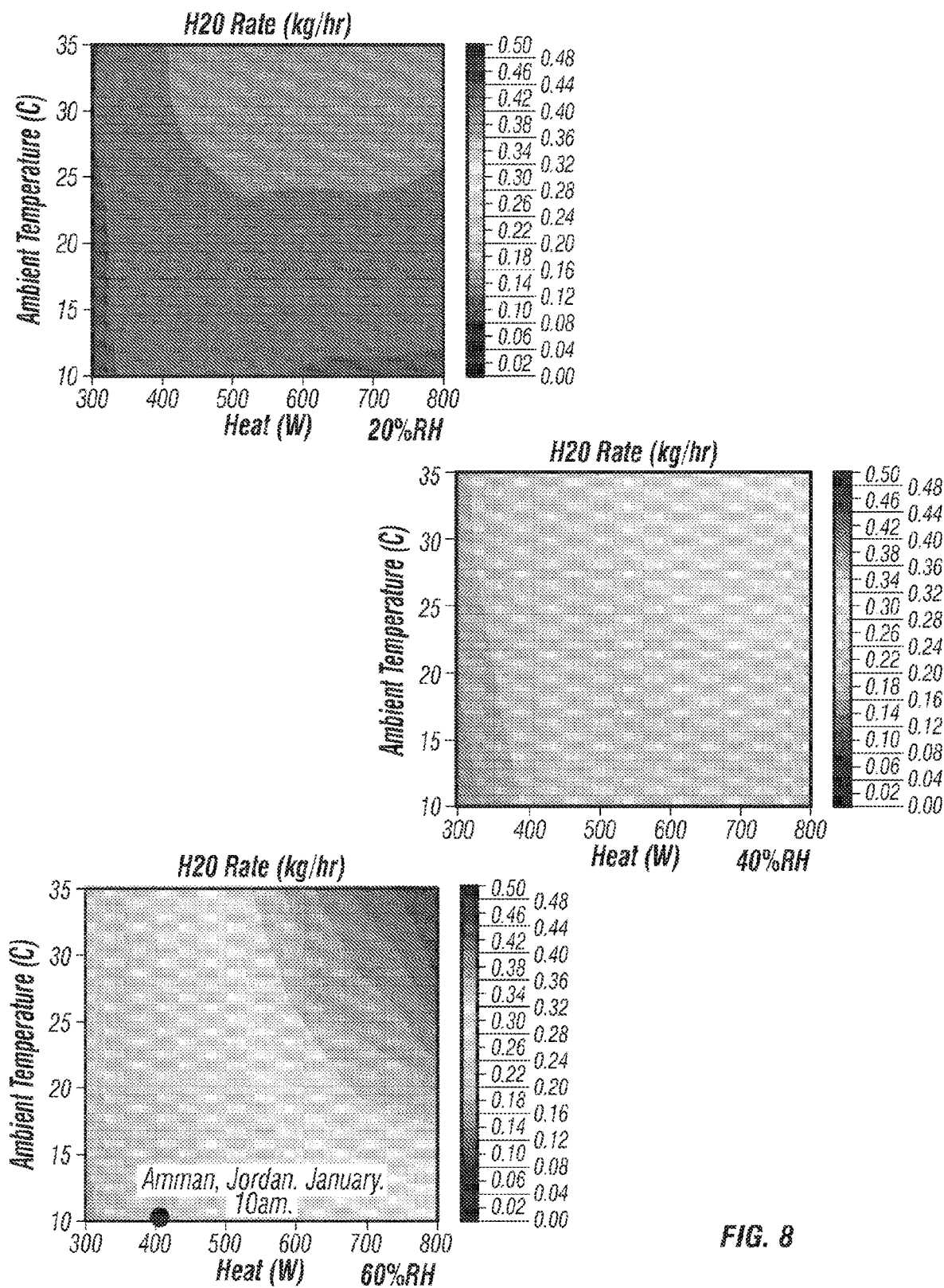
FIG. 8 is a series graphs illustrating a liquid water production rate in liters per hour (L/hr) of some embodiments of the present systems for generating liquid water from air (e.g., highest liquid water production rate represented as darkest gray), at constant ambient air relative humidities ("RH"), at a constant process airflow rate of 90 cfm, versus environmental diurnal variations, including ambient air temperature (° C.) and solar insolation as indicated by heat (W) provided by a thermal unit, such that each point on each graph may represent a system liquid water production rate at a point in a diurnal cycle (e.g., in Amman, Jordan, on a day in July, at 2:00 PM, RH was 26% (approximately 30%), and heat was 700 W (generated by a solar thermal unit having an area of 1.5 square meters ($m^2$) at an efficiency of 50%), which resulted in a liquid water production rate of approximately 0.30 L/hr).
Figure 8:
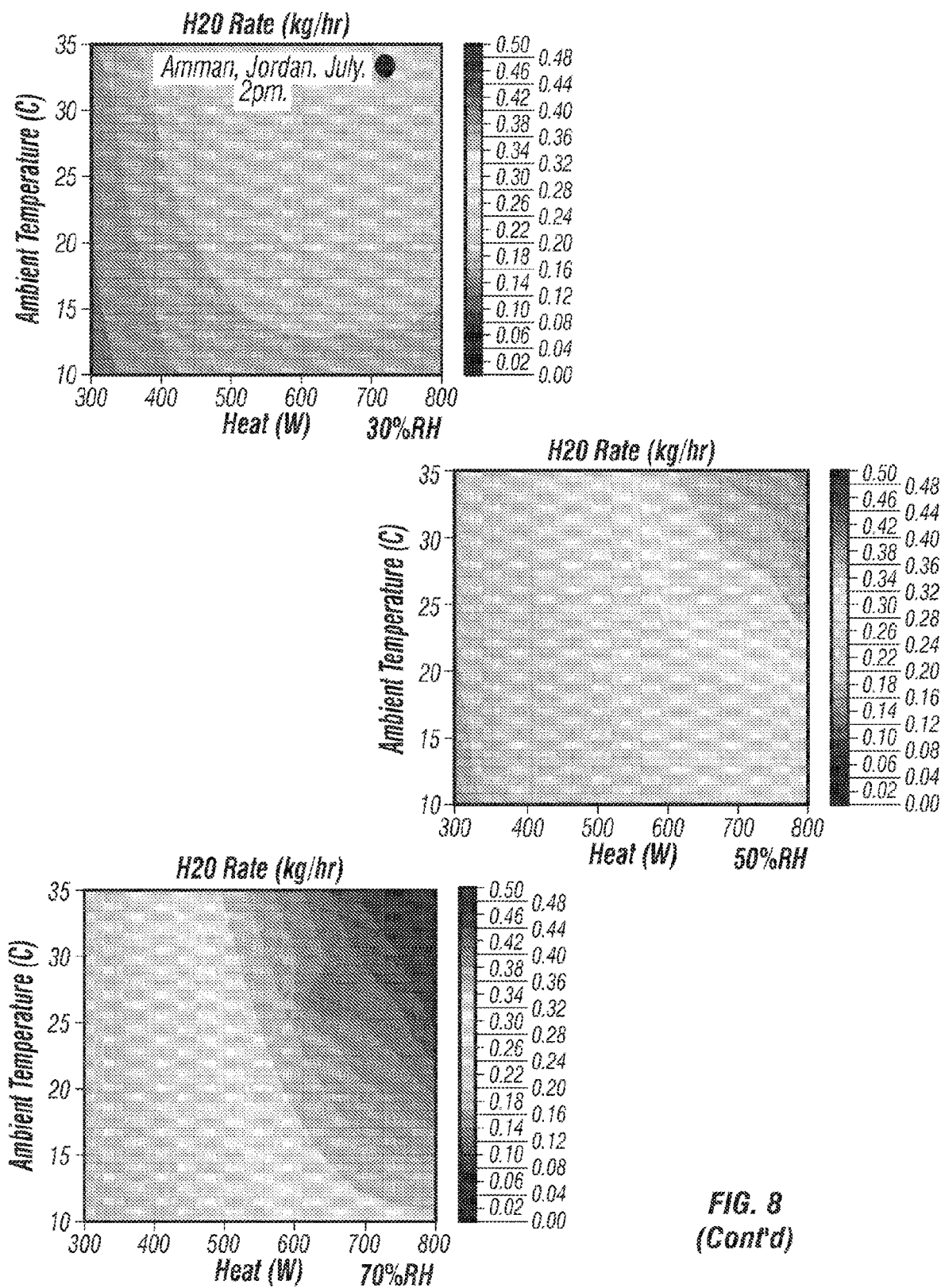

FIG. 8 is a series of graphs illustrating a liquid water production rate in kilograms per hour (kg/hr) of some embodiments of the present systems for generating liquid water from air (e.g., highest liquid water production rate represented as darkest gray), at constant ambient air relative humidities ("RH"), at a constant process airflow rate of 90 cfm, versus environmental diurnal variations, including ambient air temperature (° C.) and solar insolation as indicated by heat (W) provided by a thermal unit, such that each point on each graph may represent a system liquid water production rate at a point in a diurnal cycle (e.g., in Amman, Jordan, on a day in July, at 2:00 PM, RH was 26% (approximately 30%), and heat was 700 W (generated by a solar thermal unit having an area of 1.5 square meters (m2) at an efficiency of 50%), which resulted in a liquid water production rate of approximately 0.30 kg/hr).

Figure 9:
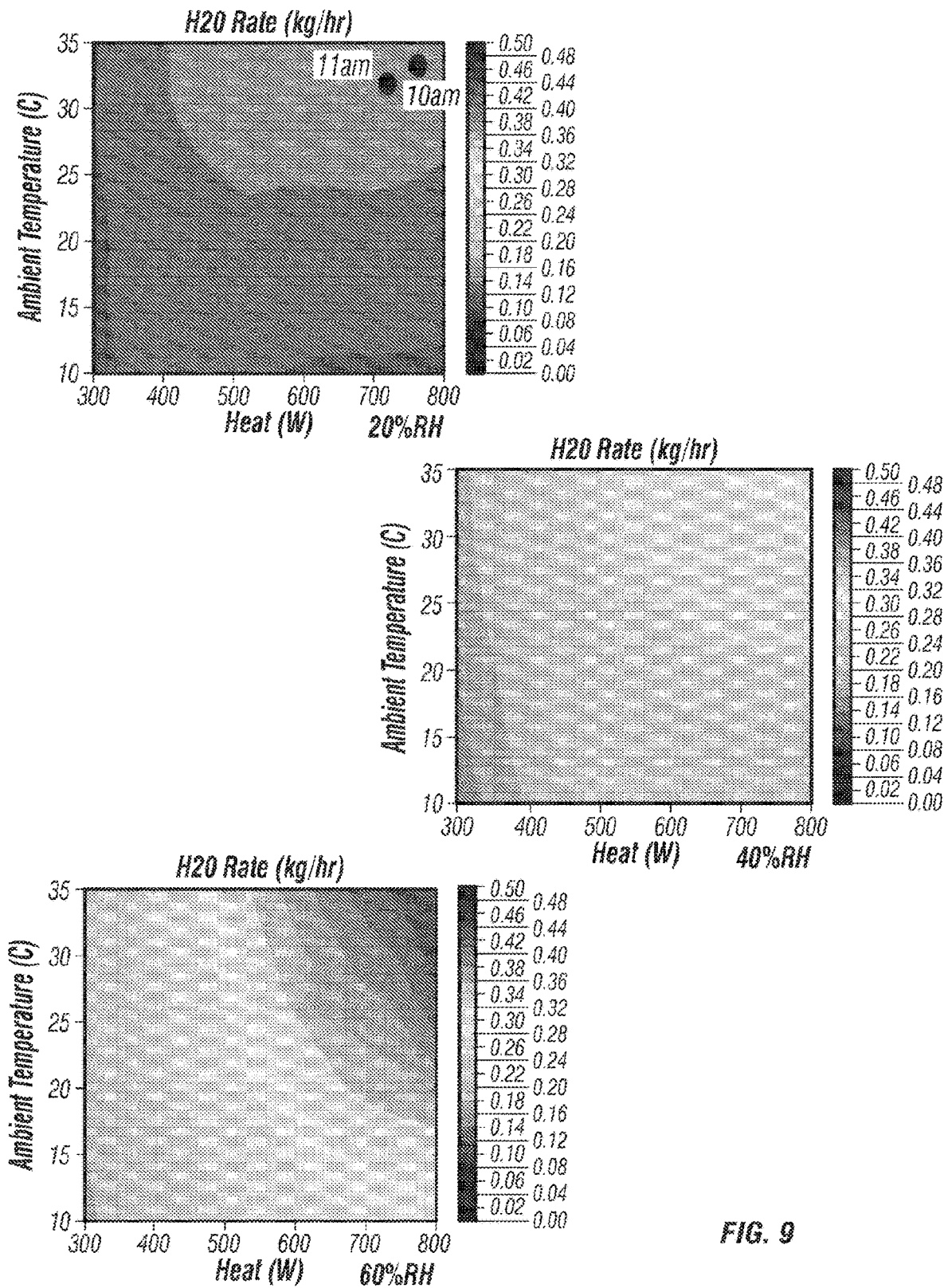
FIG. 9 is the series of graphs of FIG. 8, including points representing various times on a given day. A total amount of liquid water produced during the day may be approximated by integrating across the series of graphs (e.g., in this example, approximately 2.5 liters (L) in the morning hours of the day, and approximately 5 L over a 24 hour period).
Figure 9:
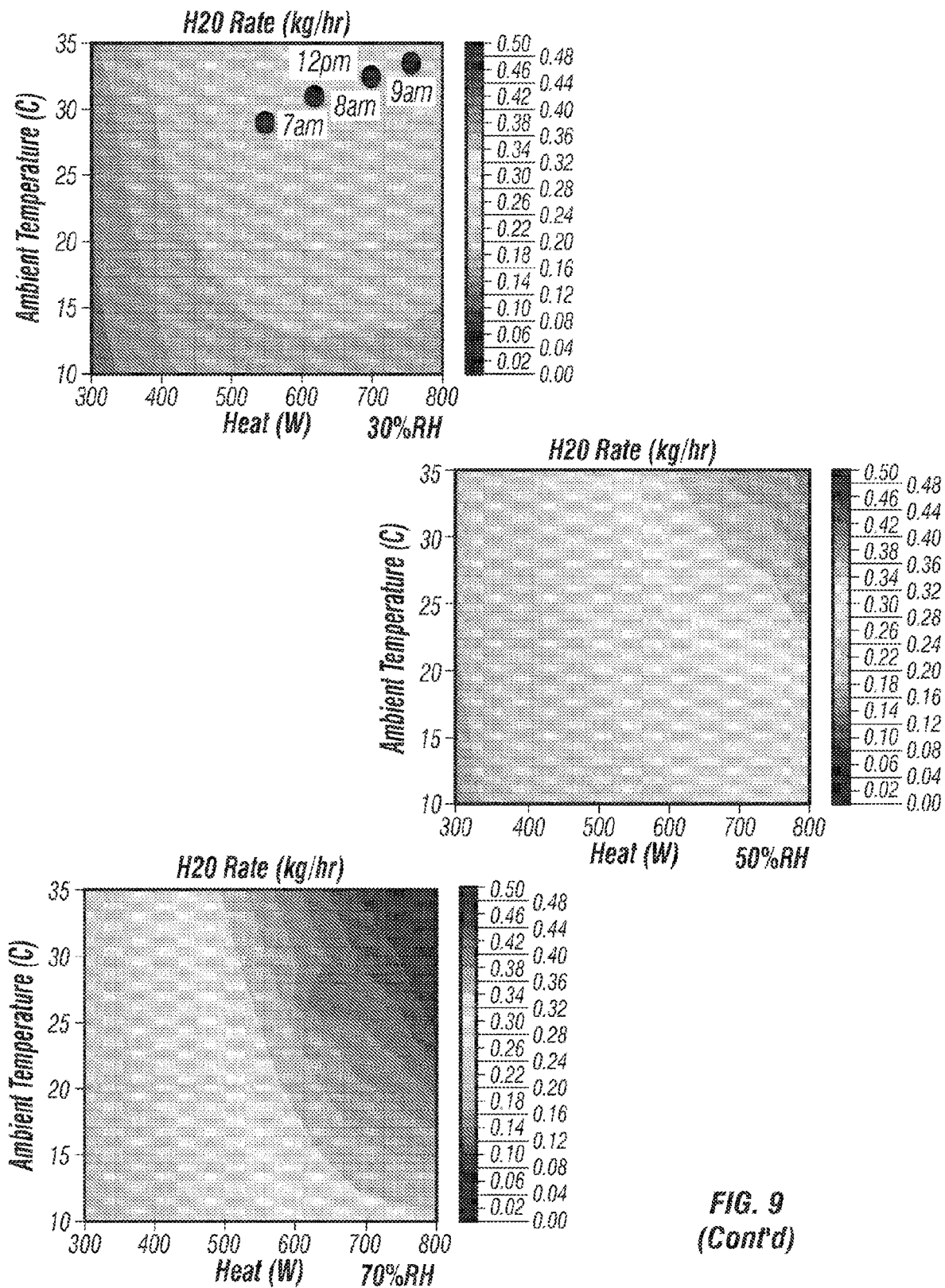

FIG. 9 is the series of graphs of FIG. 8, including points representing various times on a given day. A total amount of liquid water produced during the day may be approximated by integrating across the series of graphs (e.g., in this example, approximately 2.5 liters (L) in the morning hours of the day, and approximately 5 L over a 24 hour period).

In some embodiments, a controller (e.g., 50) may reference a parametric function (e.g., and/or a table generated thereby) to operate according to optimal (e.g., in terms of liquid water production rate and/or efficiency) operational variables for the system. For example, for each system operational variable (e.g., process air flow rate, regeneration fluid flow rate, desiccant exposure time to process air and/or regeneration fluid, and/or the like), a parametric function can be created that provides the value of the system operational variable which optimizes efficiency and/or liquid water production rate of the system, and the parametric function may be dependent on design specifications (e.g., disk kinetics, disk size, desiccant configuration, solar collector size, condenser geometry and performance, and/or the like) and/or variable ambient conditions (e.g., ambient air temperature, ambient air relative humidity, a level of solar insolation).

By way of illustration, an example derivation of a (e.g., relatively simple two variable) parametric function is provided below. In this example, a simulation (e.g., as described above with respect to FIG. 5B) may be performed holding all variables constant except for a system operational variable (e.g., in the following example, ambient air temperature is held constant, and regeneration fluid flow rate may be varied). In subsequent steps, the simulation may be repeated, changing the value of the constant (e.g., ambient air temperature, in this example) between simulations in order to develop multiple data sets. Table 2 provides exemplary efficiency data obtained from such simulations (e.g., seven (7) data sets are represented in Table 2, representing simulations performed at seven (7) values of constant ambient air temperature).

TABLE 2

Exemplary Efficiency versus Regeneration Fluid Flow Rate Data for an Embodiment of the Present Systems for Generating Liquid Water from Air

| Temperature (° C.) | MFRi (cfm) | Efficiency |
|---|---|---|
| 16 | 16 | 0.497785 |
| 16 | 18 | 0.491958 |
| 16 | 20 | 0.486554 |
| 16 | 22 | 0.480552 |
| 16 | 24 | 0.473718 |
| 16 | 26 | 0.465896 |
| 16 | 28 | 0.457135 |
| 16 | 30 | 0.44745 |
| 16 | 32 | 0.436656 |
| 18 | 16 | 0.483841 |
| 18 | 18 | 0.476546 |
| 18 | 20 | 0.47014 |
| 18 | 22 | 0.463751 |
| 18 | 24 | 0.457388 |
| 18 | 26 | 0.4503 |
| 18 | 28 | 0.442473 |
| 18 | 30 | 0.433895 |
| 18 | 32 | 0.42459 |
| 20 | 16 | 0.472329 |
| 20 | 18 | 0.465762 |
| 20 | 20 | 0.459357 |
| 20 | 22 | 0.453557 |
| 20 | 24 | 0.447222 |
| 20 | 26 | 0.440308 |
| 20 | 28 | 0.43278 |
| 20 | 30 | 0.424646 |
| 20 | 32 | 0.415998 |
| 22 | 16 | 0.463092 |
| 22 | 18 | 0.458915 |
| 22 | 20 | 0.45105 |
| 22 | 22 | 0.446573 |
| 22 | 24 | 0.439184 |
| 22 | 26 | 0.432482 |
| 22 | 28 | 0.425249 |
| 22 | 30 | 0.417523 |
| 22 | 32 | 0.409271 |
| 24 | 16 | 0.45443 |
| 24 | 18 | 0.448595 |
| 24 | 20 | 0.443568 |
| 24 | 22 | 0.438111 |
| 24 | 24 | 0.432175 |
| 24 | 26 | 0.425737 |
| 24 | 28 | 0.418852 |
| 24 | 30 | 0.412195 |
| 24 | 32 | 0.403517 |
| 26 | 16 | 0.446432 |
| 26 | 18 | 0.441048 |
| 26 | 20 | 0.436394 |
| 26 | 22 | 0.431265 |
| 26 | 24 | 0.42722 |
| 26 | 26 | 0.419593 |
| 26 | 28 | 0.413006 |
| 26 | 30 | 0.405906 |
| 26 | 32 | 0.398322 |
| 28 | 16 | 0.437145 |
| 28 | 18 | 0.433456 |

TABLE 2-continued

Exemplary Efficiency versus Regeneration Fluid Flow Rate Data for an Embodiment of the Present Systems for Generating Liquid Water from Air

| Temperature (° C.) | MFRi (cfm) | Efficiency |
|---|---|---|
| 28 | 20 | 0.432251 |
| 28 | 22 | 0.424547 |
| 28 | 24 | 0.419341 |
| 28 | 26 | 0.413667 |
| 28 | 28 | 0.407432 |
| 28 | 30 | 0.400671 |
| 28 | 32 | 0.393431 |
| 22 | 26 | 0.432482 |

Figure 10:
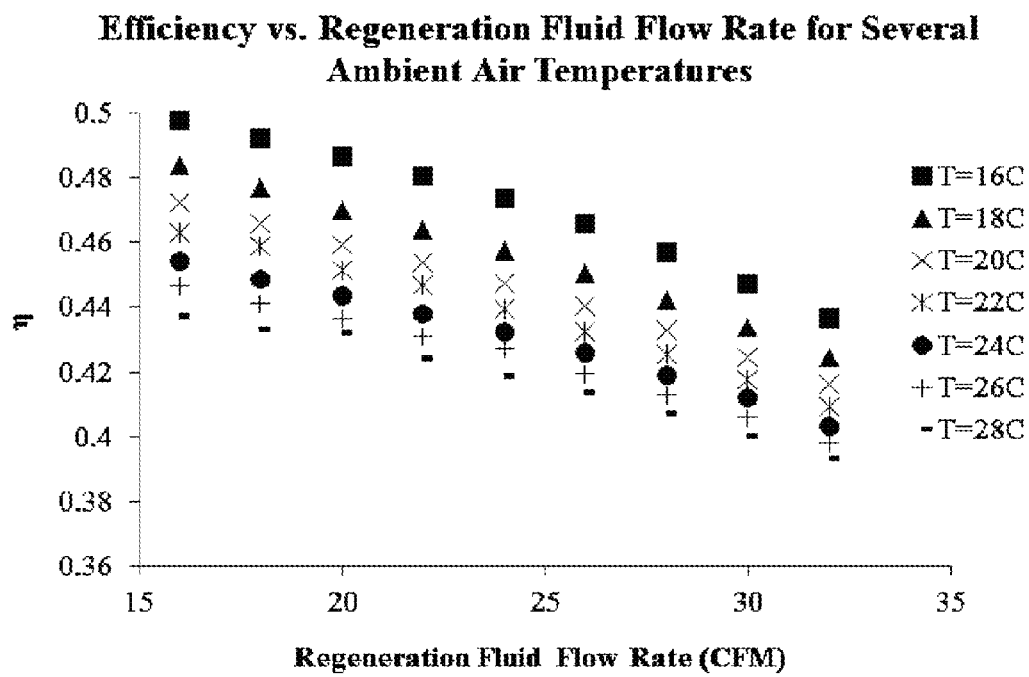
FIG. 10 is a graph illustrating efficiency of one embodiment of the present systems for generating liquid water from air, at various ambient air temperatures (° C.), versus regeneration fluid flow rate (cfm).

Data from Table 2, above, is illustrated in FIG. 10. In this example, a mathematical regression may be used to model each data set. To illustrate, a polynomial (e.g., quadratic) regression may be fitted to each data set using the following equations:

$$\eta = a_1 V_{regen}^2 + b_1 V_{regen} + c_1 \text{ at } T_{amb,1} \quad (8)$$

$$\eta = a_2 V_{regen}^2 + b_2 V_{regen} + c_2 \text{ at } T_{amb,2} \quad (9)$$

$$\eta = a_n V_{regen}^2 + b_n V_{regen} + c_n \text{ at } T_{amb,n} \quad (10)$$

where a, b, and, c, are coefficients of the quadratic regression for each n data set. These coefficients may then modeled with a (e.g., further) mathematical regression. To illustrate, in this example, a quadratic regression may be fitted to each set of coefficients, a, b, and c, using the following equations:

$$a = d_1 T_{amb}^2 + e_1 T_{amb} + f_1 \quad (11)$$

$$b = d_2 T_{amb}^2 + e_2 T_{amb} + f_2 \quad (12)$$

$$c = d_3 T_{amb}^2 + e_3 T_{amb} + f_3 \quad (13)$$

Figure 11A:
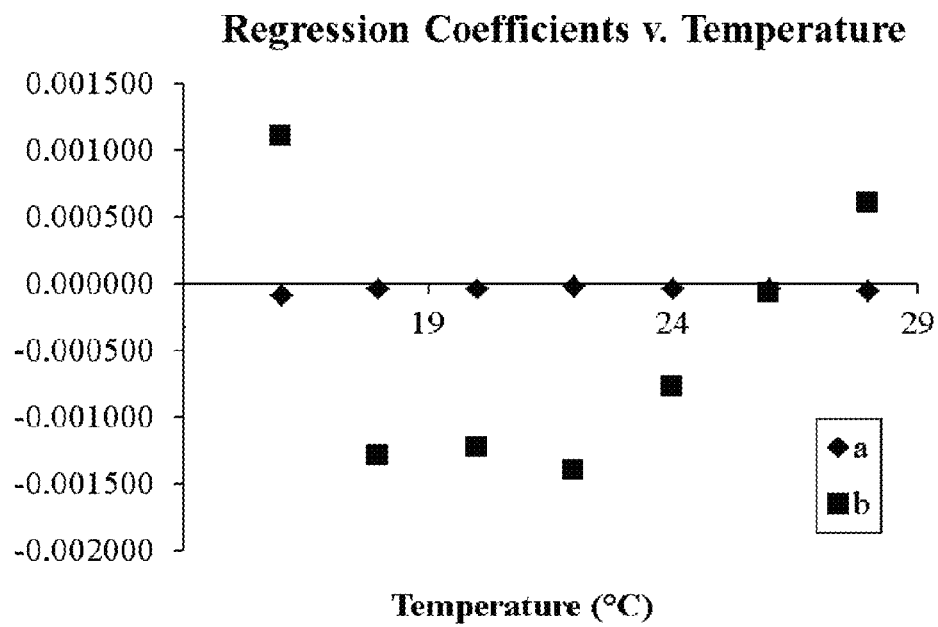
FIGS. 11A and 11B are graphs illustrating coefficients of quadratic regression models fit to the data sets illustrated in FIG. 10.
Figure 11B:
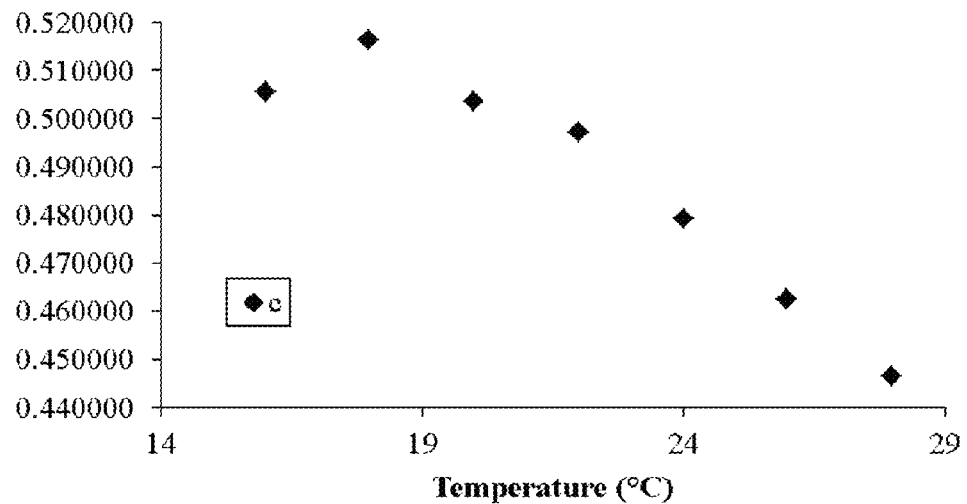

FIGS. 11A and 11B provide graphs of these coefficients versus $T_{amb}$. Through substitution, it can be seen that the efficiency of the system as a function of $T_{amb}$ and $V_{regen}$ may then be expressed as:

$$\eta = (d_1 T_{amb}^2 + e_1 T_{amb} + f_1) V_{regen}^2 + (d_2 T_{amb}^2 + e_2 T_{amb} + f_2) V_{regen} + (d_3 T_{amb}^2 + e_3 T_{amb} + f_3) \quad (14)$$

While Eq. 14 is expressed in terms of two variables (e.g., $V_{regen}$, and $T_{amb}$), the same or a substantially similar process as described above can be performed to express efficiency (e.g., and/or liquid water production rate, and/or the like) as a function of any suitable number of variables (e.g., by performing an additional regression for each added variable).

The maximum efficiency and/or maximum liquid water production rate (e.g., which may be the desired operational state for a system) may be determined by maximizing Eq. 14 (or a similar equation) with respect to each operational variable (e.g., $V_{regen}$, in this example). By way of illustration, in the depicted example, the desired operational state that maximizes efficiency may be the value of $V_{regen}$ at which the partial derivative of Eq. 14 with respect to $V_{regen}$ at a given (e.g., or measured) $T_{amb}$ is equal to zero, or:

$$\left. \frac{\partial \eta}{\partial V_{regen}} \right|_{T_{amb}} = 0 \quad (15)$$

Eq. 15 (or similar equation(s)) may be evaluated over a range of ambient conditions, which may be used to produce a table of optimal operational variables (e.g., in this example, optimal $V_{regen}$ for a range of $T_{amb}$). Such tables may then be further modeled by a mathematical regression (e.g., a quadratic regression). In this example, this can be shown as:

$$V_{regen,optimal} = gT_{amb}^2 + hT_{amb} + i \quad (16)$$

where $V_{regen,optimal}$ represents the optimal regeneration fluid flow rate at a given temperature. A controller (e.g., 50) may then reference any of: the table of optimal operational variables, a parametric equation based on the table of optimal operational variables (e.g., Eq. 16), and/or the like. In some embodiments, a controller (e.g., 50) may perform any and/or all of the above steps to develop such parametric equation(s) and/or tables. In some embodiments, a controller (e.g., 50) may be programmed with such parametric equations, for example, in some embodiments, the controller may be programmed with the following equations:

$$\omega_{disk,optimal} = f(T_{amb}, RH_{amb}, T_{regen}) \quad (17)$$

$$V_{process,optimal} = f(T_{amb}, RH_{amb}, T_{regen}) \quad (18)$$

$$V_{regen,optimal} = f(T_{amb}, RH_{amb}, T_{regen}) \quad (19)$$

where $\omega_{disk,optimal}$, $V_{process,optimal}$, and $V_{regen,optimal}$ represent optimal disk rotation rate, process air flow rate, and regeneration fluid flow rate operational variables at given values of ambient air temperature, ambient air relative humidity, and regeneration fluid temperature (e.g., indicative of a level of solar insolation).

EXEMPLARY EMBODIMENTS

The process of liquid water production from humid air is distinct from the process of dehumidification of air. In particular, liquid water production from humid air involves achieving practical liquid water production rates, rather than simply dehumidifying a volume of air. To illustrate some of the differences between these two processes, Table 3 compares an example dehumidifier system with one embodiment of the present systems for generating liquid water from air, each system operating with a process air temperature of 22° C. and a process air relative humidity of 40%.

As seen in Table 3, systems of the present disclosure are efficient at generating liquid water from air. The present systems and the methods by which the present systems operate (e.g., via control by controller 50) are distinct from dehumidification systems and/or dehumidification methods. For example, the process air flow rate within some embodiments of the present systems may be greater than the regeneration fluid flow rate (e.g., 4, 5, 6, 7, 8, 9, 10, 11, 12, 13, 14, 15, 16, 17, 18, 19, 20, or more times greater, for example, at least 5 times greater).

Further, the process air flow rate for some embodiments of the present systems is higher than viable process air flow rates for dehumidification systems and methods. Not to be bound by any particular theory, in general, some systems of the present disclosure may function more efficiently, or generate more liquid water, when a significant amount of humid air is processed (e.g., to facilitate production of liquid water at a practical water production rate). Additionally, the regeneration fluid flow rate for some embodiments of the present systems is lower than viable regeneration fluid flow rates for dehumidification systems and methods. Not to be bound by any particular theory, in general, an optimum process air flow rate for some embodiments of the present systems may be higher than a viable process air flow rate for a dehumidifier (e.g., which may target a relatively low relative humidity in exhausted process air). For example, as opposed to a dehumidifier, some of the present systems may be efficient (e.g., generate more liquid water) even if process air undergoes only a 1% reduction in relative humidity throughout the system, due, at least in part, to a high process air flow rate (e.g., in some instances, 100 to 1000 times a process air flow rate within a typical dehumidifier).

A non-limiting example of an embodiment of the invention will now be described. In the example described, an alumina desiccant (e.g., 18) having a thickness of 5 cm and a diameter of 12 cm is disposed on a rotatable disk (e.g., 102). In the following example, the process air flow rate is 90 cfm, and the regeneration fluid flow rate is 6 cfm. With these parameters, a controller may operate the system such that efficiency is greater 30% (e.g., as determined from a multi-dimensional analysis as depicted in FIGS. 10-14, which may be stored in a memory in communication with the controller as a look-up table).

TABLE 3

Comparison of a Dehumidifier and an Embodiment of the Present Systems for Generating Liquid Water from Air

|  | Dehumidifier System | System for Generating Liquid Water from Air |
| --- | --- | --- |
| Process air flow rate (cfm) | 45 | 120 |
| Regeneration fluid flow rate (cfm) | 13 | 8 |
| Desiccant disk rotation rate (°/s) | 3.6 | 1.1 |
| Heat (W) | 500 | 500 |
| Process air exhaust relative humidity | 12% | 29% |
| Liquid water production rate in milliliter per hour (ml/hr) | 80 | 250 |
| Liquid water production efficiency | 10% | 31% |

Figure 12:
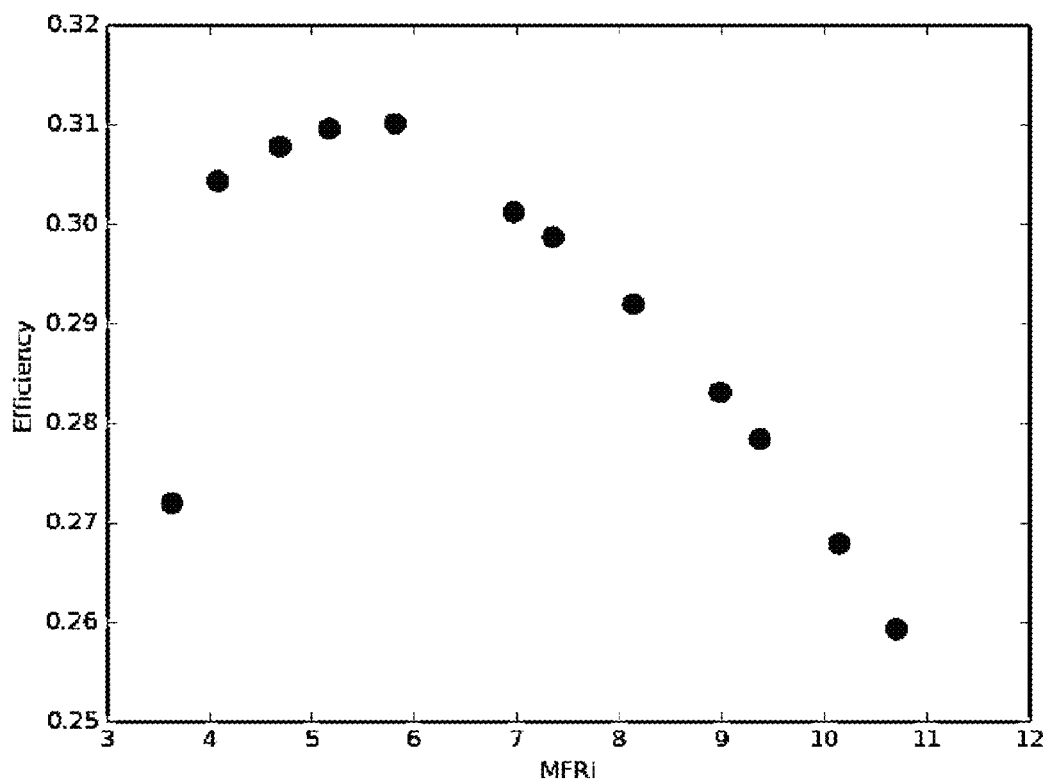
FIG. 12 is a graph, in one dimension, of a multi-dimensional analysis, illustrating an efficiency of some embodiments of the present systems for generating liquid water from air versus regeneration fluid flow rate (cfm) ("MFRi").

FIG. 12 is a graph, in one dimension, of a multi-dimensional analysis, illustrating an efficiency of some embodiments of the present systems for generating liquid water from air versus regeneration fluid flow rate (cfm) ("MFRi"). As shown, for this embodiment, an efficiency of approximately 30% can be obtained at a regeneration fluid flow rate of 6 cfm.

Figure 13:
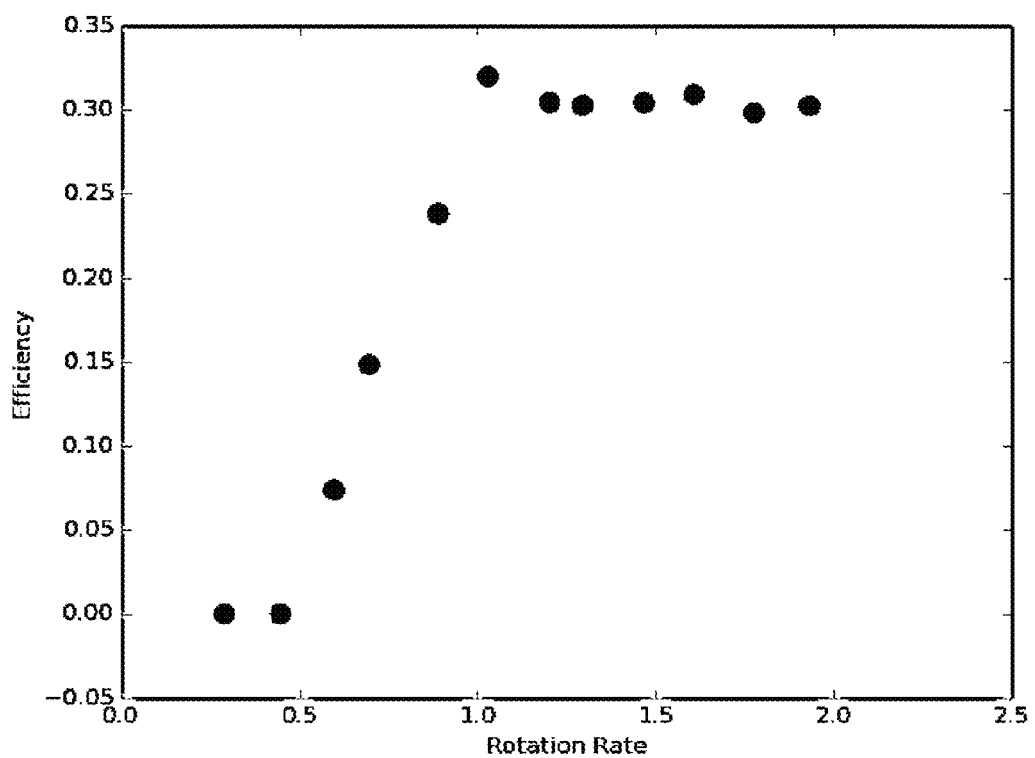
FIG. 13 is a graph, in one dimension, of a multi-dimensional analysis, illustrating an efficiency of some embodiments of the present systems for generating liquid water from air versus desiccant disk rotation rate in degrees per second (°/s).

FIG. 13 is a graph, in one dimension, of a multi-dimensional analysis, illustrating an efficiency of some embodiments of the present systems for generating liquid water from air versus desiccant disk rotation rate (°/s). As shown, for this embodiment, an efficiency over 30% may be obtained at a desiccant disk rotation rate greater than 1°/s.

Figure 14A:
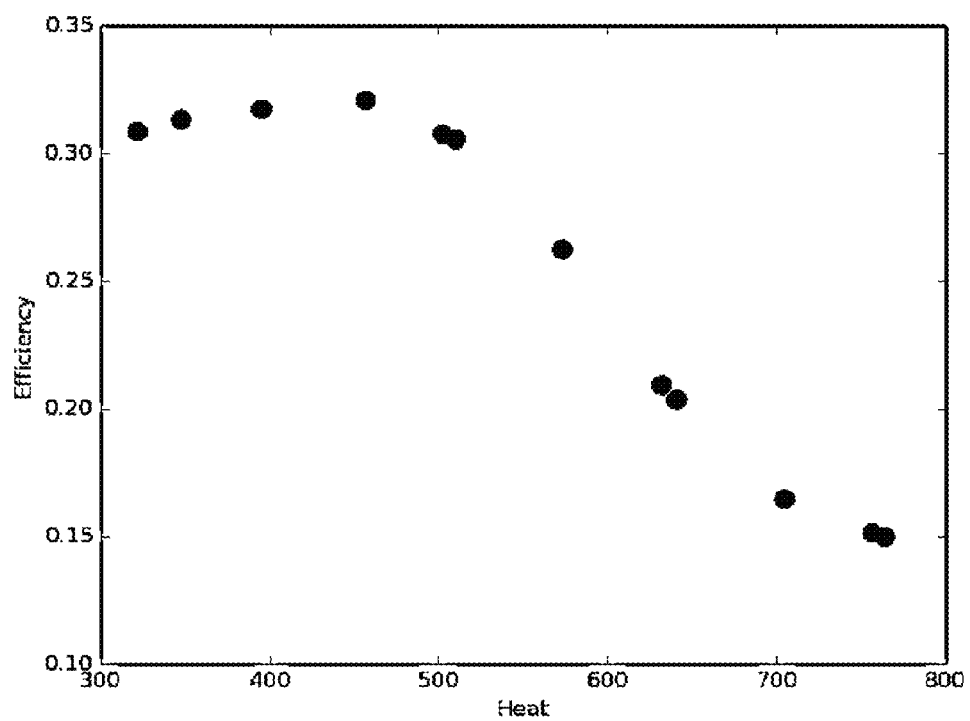
FIG. 14A is a graph, in one dimension, of a multi-dimensional analysis, illustrating an efficiency of some embodiments of the present systems for generating liquid water from air versus solar insolation as indicated by heat (W) provided by a thermal unit.
Figure 14B:
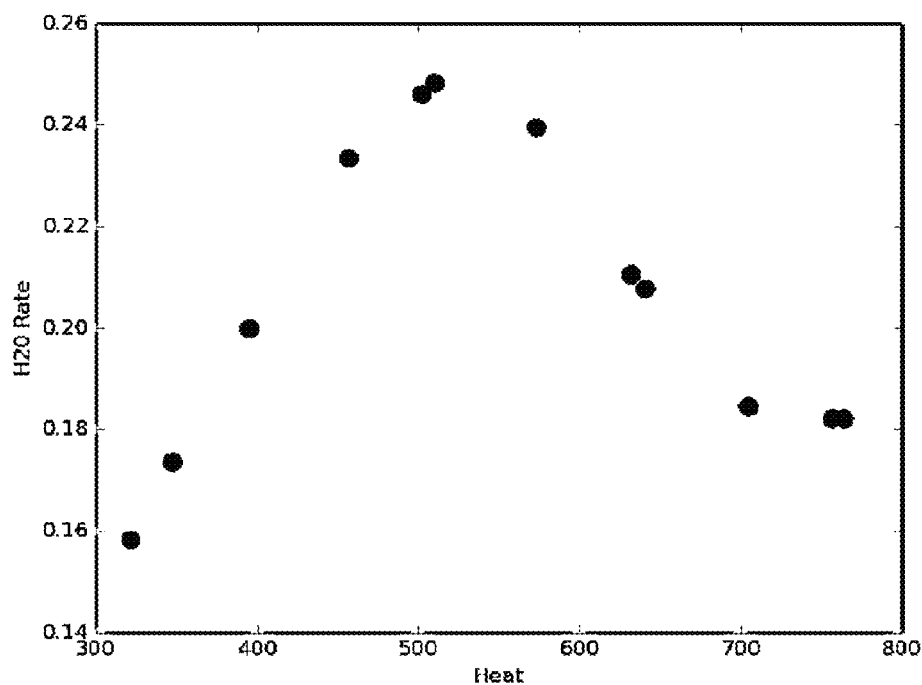
FIG. 14B is a graph, in one dimension, of a multi-dimensional analysis, illustrating a liquid water production rate (L/hr) of some embodiments of the present systems for generating liquid water from air, versus solar insolation as indicated by heat (W) provided by a thermal unit.

FIG. 14A is a graph, in one dimension, of a multi-dimensional analysis, illustrating an efficiency of some embodiments of the present systems for generating liquid water from air versus solar insolation as indicated by heat (W) provided by a thermal unit. FIG. 14B is a graph, in one dimension, of a multi-dimensional analysis, illustrating a liquid water production rate (L/hr) of some embodiments of the present systems for generating liquid water from air, versus solar insolation as indicated by heat (W) provided by a thermal unit. As shown, for this embodiment, an efficiency over 30% may be obtained when heat provided by a thermal unit is less than 500 W (FIG. 14A). Additionally, as shown, for this embodiment, a liquid water production rate may be greater than 0.24 L/hr is determined when heat provided by a thermal unit is approximately 500 W (FIG. 14A).

Figure 15:
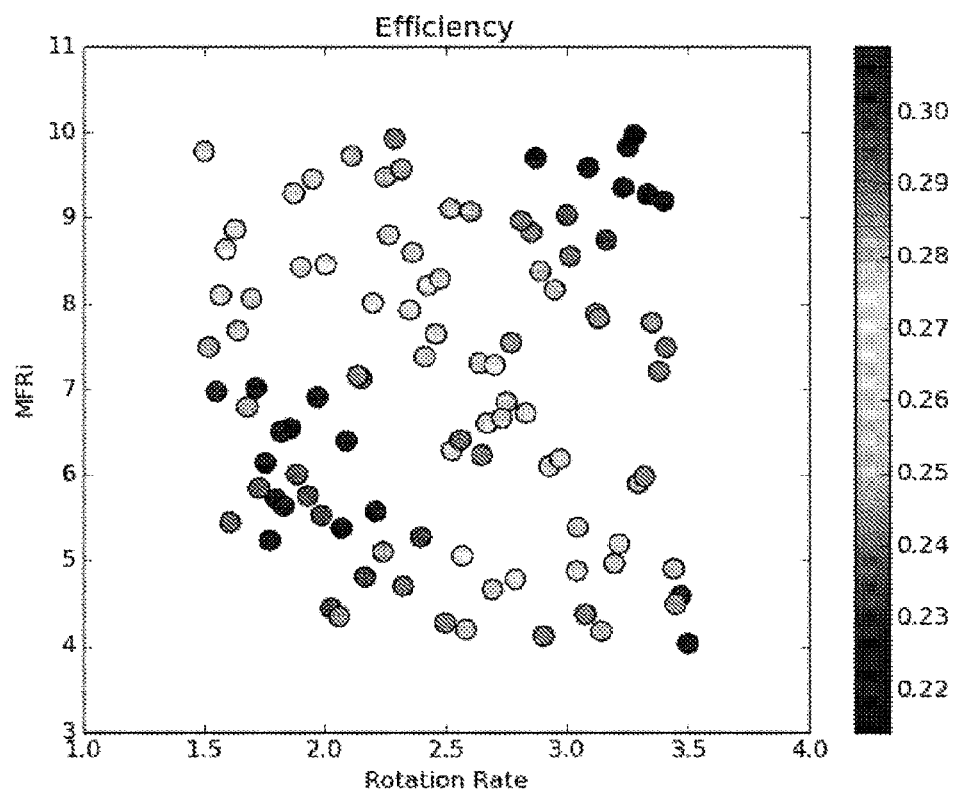
FIG. 15 is a graph illustrating an efficiency of some embodiments of the present systems for generating liquid water from air versus desiccant disk rotation rate (°/s) and regeneration fluid flow rate (cfm).

FIG. 15 is a graph illustrating an efficiency of some embodiments of the present systems for generating liquid water from air versus desiccant disk rotation rate (°/s) and regeneration fluid flow rate (cfm). As shown, for this embodiment, an efficiency over 30% may be obtained for a desiccant disk rotation between 1.5 and 2.0°/s, and a regeneration fluid flow rate between 5 and 7 cfm.

Figure 16:
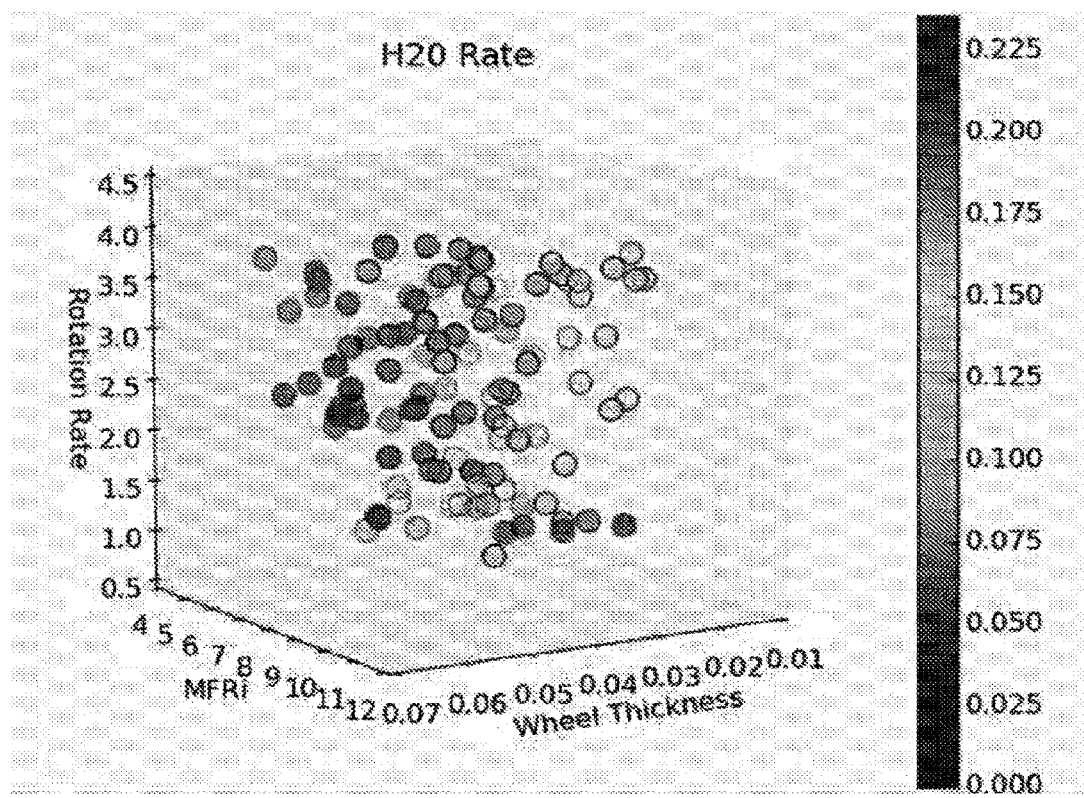
FIG. 16 is a graph illustrating a liquid water production rate (L/hr) of some embodiments of the present systems for generating liquid water from air, versus desiccant thickness in meters (m), regeneration fluid flow rate (cfm), and desiccant disk rotation rate (°/s).

FIG. 16 is a graph illustrating a liquid water production rate (hr) of some embodiments of the present systems for generating liquid water from air, versus desiccant thickness (m), regeneration fluid flow rate (cfm), and desiccant disk rotation rate (°/s). As shown, for this embodiment, the liquid water production rate may be greater than 0.2 L/hr for a desiccant thickness greater than 5 centimeters (cm), a regeneration fluid flow rate between 5 and 7 cfm, and a desiccant disk rotation rate between 1.5 and 2.0°/s.

If implemented in firmware and/or software, the functions described above may be stored as one or more instructions or code on a non-transitory computer-readable medium. Examples include non-transitory computer-readable media encoded with a data structure and non-transitory computer-readable media encoded with a computer program. Non-transitory computer-readable media are physical computer storage media. A physical storage medium may be any available medium that can be accessed by a computer. By way of example, and not limitation, such non-transitory computer-readable media can comprise RAM, ROM, EPROM, EEPROM, CD-ROM or other optical disk storage, magnetic disk storage or other magnetic storage devices, or any other physical medium that can be used to store desired program code in the form of instructions or data structures and that can be accessed by a computer. Disk and disc includes compact discs (CD), laser discs, optical discs, digital versatile discs (DVD), floppy disks and Blu-ray discs. Generally, disks reproduce data magnetically, and discs reproduce data optically. Combinations of the above are also be included within the scope of non-transitory computer-readable media. Moreover, the functions described above may be achieved through dedicated devices rather than software, such as a hardware circuit comprising custom VLSI circuits or gate arrays, off-the-shelf semiconductors such as logic chips, transistors, or other discrete components, all of which are non-transitory. Additional examples include programmable hardware devices such as field programmable gate arrays, programmable array logic, programmable logic devices or the like, all of which are non-transitory. Still further examples include application specific integrated circuits (ASIC) or very large scale integrated (VLSI) circuits. In fact, persons of ordinary skill in the art may utilize any number of suitable structures capable of executing logical operations according to the described embodiments.

The above specification and examples provide a complete description of the structure and use of illustrative embodiments. Although certain embodiments have been described above with a certain degree of particularity, or with reference to one or more individual embodiments, those skilled in the art could make numerous alterations to the disclosed embodiments without departing from the scope of this invention. As such, the various illustrative embodiments of the methods and systems are not intended to be limited to the particular forms disclosed. Rather, they include all modifications and alternatives falling within the scope of the claims, and embodiments other than the one shown may include some or all of the features of the depicted embodiment. For example, elements may be omitted or combined as a unitary structure, and/or connections may be substituted. Further, where appropriate, aspects of any of the examples described above may be combined with aspects of any of the other examples described to form further examples having comparable or different properties and/or functions, and addressing the same or different problems. Similarly, it will be understood that the benefits and advantages described above may relate to one embodiment or may relate to several embodiments.

The claims are not intended to include, and should not be interpreted to include, means-plus- or step-plus-function limitations, unless such a limitation is explicitly recited in a given claim using the phrase(s) "means for" or "step for," respectively.

The invention claimed is:

1. A system for generating liquid water from air, the system comprising:
   a desiccant configured to be in fluid communication with a process airflow path and a regeneration fluid path, wherein:
      water is captured from air in the process airflow path; and
      water is released to regeneration fluid in the regeneration fluid path;
   a condenser configured to receive regeneration fluid from the desiccant via the regeneration fluid path and to produce the liquid water from the regeneration fluid received from the desiccant;
   a sensor configured to capture data indicative of a level of solar insolation; and
   a controller configured to control a production rate of the liquid water by controlling at least one of:
      a flow rate of air through the process airflow path; or
      a flow rate of regeneration fluid through the regeneration fluid path,
   based, at least in part, on a signal received from the sensor.

2. The system of claim 1 further comprising one or more of:
a housing defining an adsorption zone and a desorption zone, wherein:
the desiccant is selectively movable between:
the adsorption zone in which the desiccant is in fluid communication with the process airflow path such that the desiccant can capture water from air in the process airflow path; and
the desorption zone in which the desiccant is in fluid communication with the regeneration fluid path such that the desiccant can release water to regeneration fluid in the regeneration fluid path;
a blower configured to adjust the flow rate of air through the process airflow path;
a circulator configured to adjust the flow rate of regeneration fluid through the regeneration fluid path; or
a thermal unit comprising a casing in fluid communication with the regeneration fluid path and configured to provide thermal energy to regeneration fluid in the regeneration fluid path.

3. The system of claim 1, wherein the controller is configured to control the production rate of the liquid water over a diurnal cycle based, at least in part, on diurnal variations in the level of solar insolation, as captured by the data from the sensor.

4. The system of claim 2, wherein the housing is configured such that dimensions of the adsorption zone and the desorption zone are adjustable.

5. The system of claim 1, further comprising a temperature sensor configured to capture data indicative of an ambient air temperature.

6. The system of claim 1, further comprising a humidity sensor configured to capture data indicative of an ambient air relative humidity.

7. The system of claim 2, wherein the sensor comprises a temperature sensor configured to capture data indicative of a temperature of regeneration fluid in the regeneration fluid path downstream of the thermal unit.

8. The system of claim 1, further comprising:
a temperature sensor configured to capture data indicative of a temperature of air in the process airflow path,
wherein the controller is configured to control the production rate of the liquid water based, at least in part, on the data captured by the temperature sensor.

9. The system of claim 1, further comprising:
a humidity sensor configured to capture data indicative of a relative humidity of air in the process airflow path,
wherein the controller is configured to control the production rate of the liquid water based, at least in part, on the data captured by the humidity sensor.

10. The system of claim 1, further comprising:
a humidity sensor configured to capture data indicative of a relative humidity of regeneration fluid in the regeneration fluid path,
wherein the controller is configured to control the production rate of the liquid water based, at least in part, on the data captured by the humidity sensor.

11. The system of claim 1, further comprising:
a flow sensor configured to capture data indicative of the flow rate of air through the process airflow path,
wherein the controller is configured to control the production rate of the liquid water based, at least in part, on the data captured by the flow sensor.

12. The system of claim 1, further comprising:
a flow sensor configured to capture data indicative of the flow rate of regeneration fluid through the regeneration fluid path,
wherein the controller is configured to control the production rate of the liquid water based, at least in part, on the data captured by the flow sensor.

13. The system of claim 2, wherein the thermal unit is configured to absorb sunlight to provide at least a portion of the thermal energy to regeneration fluid in the regeneration fluid path.

14. The system of claim 13, wherein the thermal unit comprises:
a transparent layer configured to allow sunlight to enter the casing of the thermal unit;
an absorber configured to absorb thermal energy from the sunlight and provide at least a portion of the thermal energy absorbed from the sunlight to regeneration fluid in the regeneration fluid path; and
an insulator configured to insulate at least a portion of the casing.

15. The system of claim 2, wherein the condenser is configured to transfer thermal energy from regeneration fluid in the regeneration fluid path downstream of the desiccant to air in the process airflow path upstream of the desiccant.

16. The system of claim 1, further comprising a water collection unit configured to receive the liquid water produced from the condenser.

17. The system of claim 16, wherein the water collection unit comprises a filter.

18. The system of claim 16, wherein the water collection unit comprises an ultraviolet (UV) light source.

19. The system of claim 16, wherein the water collection unit comprises a receptacle configured to receive one or more additives for introduction to the produced liquid water produced from the condenser.

20. The system of claim 16, wherein the water collection unit has a footprint with a maximum transverse dimension less than or equal to 8 feet (ft).

21. The system of claim 20, wherein an area of the footprint is less than or equal to 64 square feet ($ft^2$).

22. The system of claim 20, wherein the water collection unit can be contained within a cubic volume less than or equal to 512 cubic feet ($ft^3$).

23. The system of claim 1, further comprising a solar power unit configured to provide electrical power to the system.

24. The system of claim 23, wherein the solar power unit comprises a solar panel.

25. The system of claim 23, wherein the system is configured to operate without an external source of electrical power.

26. The system of claim 2, further comprising a purge airflow path configured to transfer thermal energy from a portion of the adsorption zone to a portion of the desorption zone.

27. The system of claim 26, wherein the controller is configured to increase liquid water production based, at least in part, on a temperature of air in the purge airflow path.

28. The system of claim 2, further comprising a recovery heat exchanger configured to transfer thermal energy from regeneration fluid in the regeneration fluid path downstream of the desiccant to regeneration fluid in the regeneration fluid path upstream of the desiccant.

29. The system of claim 2, further comprising a second desiccant configured to at least one of:
  transfer water from regeneration fluid in the regeneration fluid path downstream of the condenser to regeneration fluid in the regeneration fluid path upstream the condenser; or
  transfer heat from one portion of the regeneration fluid path to another.

30. The system of claim 2, wherein the desiccant is disposed on a disk that is rotated to move the desiccant between the adsorption zone and the desorption zone as the disk is rotated.

31. The system of claim 2, wherein the system is configured such that a first portion of the desiccant can be disposed within the adsorption zone while a second portion of the desiccant is simultaneously disposed within the desorption zone.

32. The system of claim 2, wherein each of the housing, the thermal unit, and the condenser have a respective footprint with a respective maximum transverse dimension less than or equal to 8 feet (ft).

33. The system of claim 1, further comprising a transceiver configured to receive and transmit information associated with operation of the system.

34. The system of claim 1, wherein the regeneration fluid path comprises a closed-loop.

* * * * *